United States Patent
Mori et al.

(10) Patent No.: US 7,859,205 B2
(45) Date of Patent: Dec. 28, 2010

(54) MOTOR DRIVE APPARATUS AND MOTOR DRIVE METHOD

(75) Inventors: Hideaki Mori, Hyogo (JP); Yasunori Yamamoto, Osaka (JP); Noriaki Emura, Osaka (JP)

(73) Assignee: Panasonic Corporation, Osaka (JP)

( * ) Notice: Subject to any disclaimer, the term of this patent is extended or adjusted under 35 U.S.C. 154(b) by 365 days.

(21) Appl. No.: 12/051,471

(22) Filed: Mar. 19, 2008

(65) Prior Publication Data

US 2008/0231219 A1  Sep. 25, 2008

(30) Foreign Application Priority Data

Mar. 23, 2007 (JP) .............................. 2007-076782

(51) Int. Cl.
*H02P 23/04* (2006.01)
(52) U.S. Cl. ..................... 318/379; 318/434; 318/448
(58) Field of Classification Search ................ 318/375, 318/379, 380, 430–434, 448, 623, 629
See application file for complete search history.

(56) References Cited

U.S. PATENT DOCUMENTS

| 4,250,435 | A | * | 2/1981 | Alley et al. ............. 318/400.03 |
| 4,994,950 | A | * | 2/1991 | Gritter .......................... 363/41 |
| 5,045,988 | A | * | 9/1991 | Gritter et al. .................. 363/35 |
| 6,239,998 | B1 | | 5/2001 | Majumdar et al. |
| 2002/0195981 | A1 | | 12/2002 | Sakai et al. |
| 2003/0102833 | A1 | | 6/2003 | Murakami |
| 2004/0124804 | A1 | | 7/2004 | Matsunaga et al. |
| 2004/0232874 | A1 | | 11/2004 | Fukamizu et al. |
| 2004/0245948 | A1 | | 12/2004 | Sakai et al. |
| 2004/0263104 | A1 | | 12/2004 | Iwanaga et al. |
| 2005/0134211 | A1 | | 6/2005 | Fukamizu et al. |
| 2005/0146303 | A1 | | 7/2005 | Fukamizu et al. |
| 2006/0028161 | A1 | | 2/2006 | Yamamoto et al. |
| 2006/0055352 | A1 | | 3/2006 | Mori et al. |
| 2006/0097674 | A1 | | 5/2006 | Nishihara et al. |
| 2006/0197480 | A1 | | 9/2006 | Mori et al. |

FOREIGN PATENT DOCUMENTS

| JP | 4-285427 | 10/1992 |
| JP | 2003-79182 A | 3/2003 |
| JP | 2003-235287 A | 8/2003 |
| JP | 2004-215385 A | 7/2004 |
| JP | 2004-274880 A | 9/2004 |
| JP | 2004-364381 A | 12/2004 |
| JP | 2005-39991 A | 2/2005 |
| JP | 2005-185019 A | 7/2005 |
| JP | 2005-185020 A | 7/2005 |
| JP | 2006-42511 A | 2/2006 |
| JP | 2006-101686 A | 4/2006 |
| JP | 2006-230120 A | 8/2006 |
| WO | WO 00/19591 | 4/2000 |
| WO | WO 2004/042912 A1 | 5/2004 |

* cited by examiner

*Primary Examiner*—Bentsu Ro
(74) *Attorney, Agent, or Firm*—RatnerPrestia

(57) ABSTRACT

To reduce noise by limiting a current peak value to a predetermined value or less and by smoothing the waveforms of drive currents during the current limitation, switching control means (30) according to the present invention turns ON all of one-side drive transistors selected from the high-side drive transistors (21, 22 and 23) and the low-side drive transistors (25, 26 and 27) of power supply means (20) for a predetermined period, and turns OFF all of the other-side drive transistors for a predetermined period in response to a current control signal for the current peak value to a predetermined value or less.

25 Claims, 18 Drawing Sheets

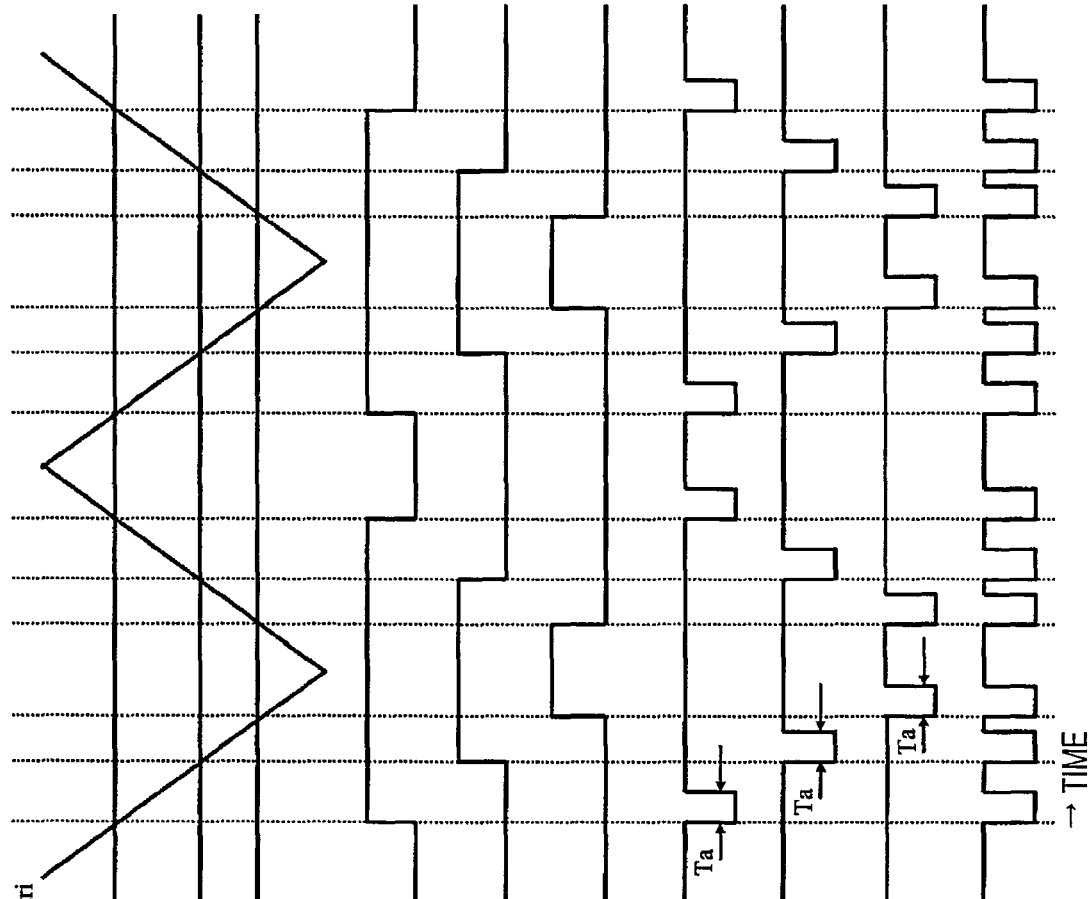

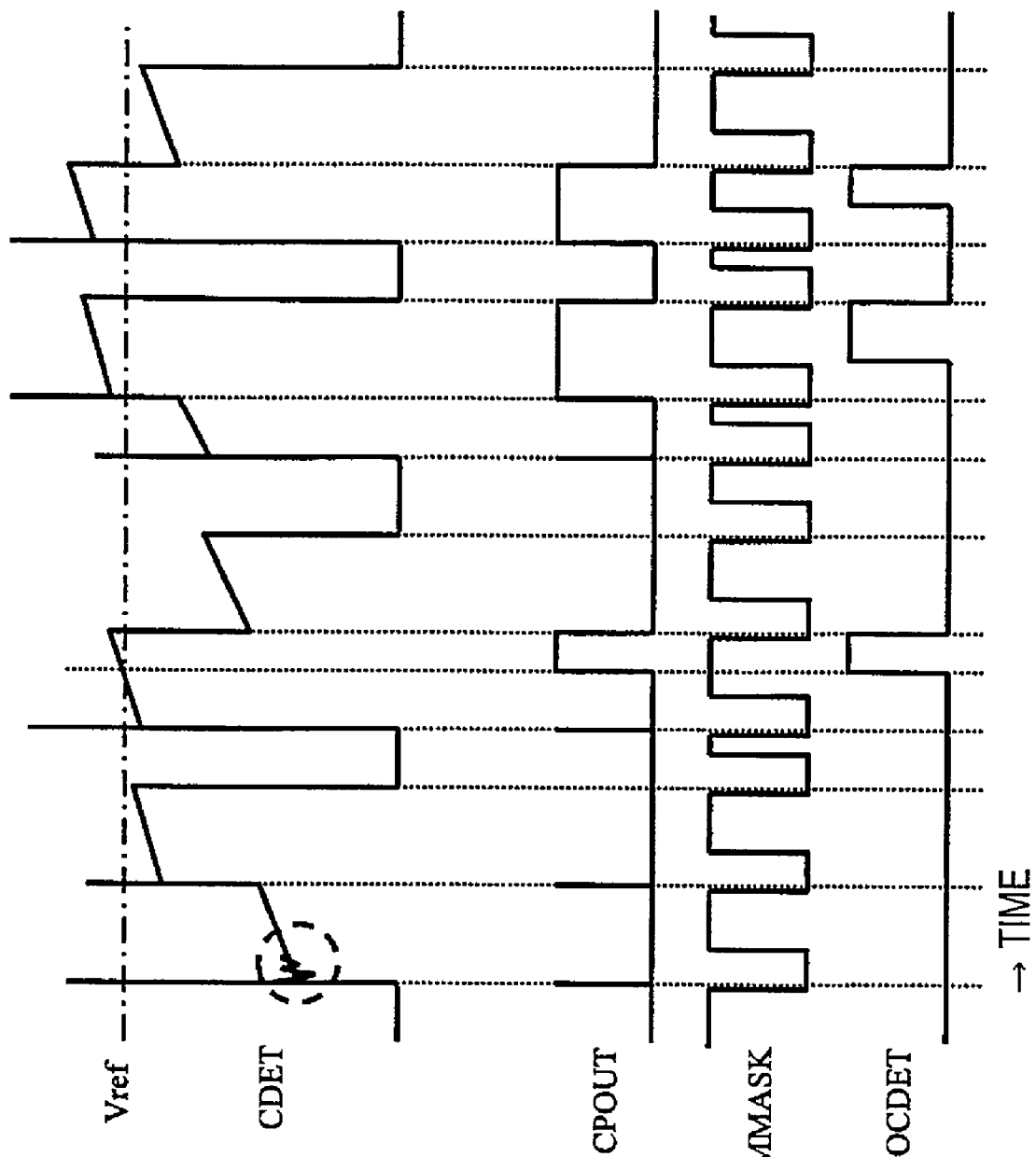

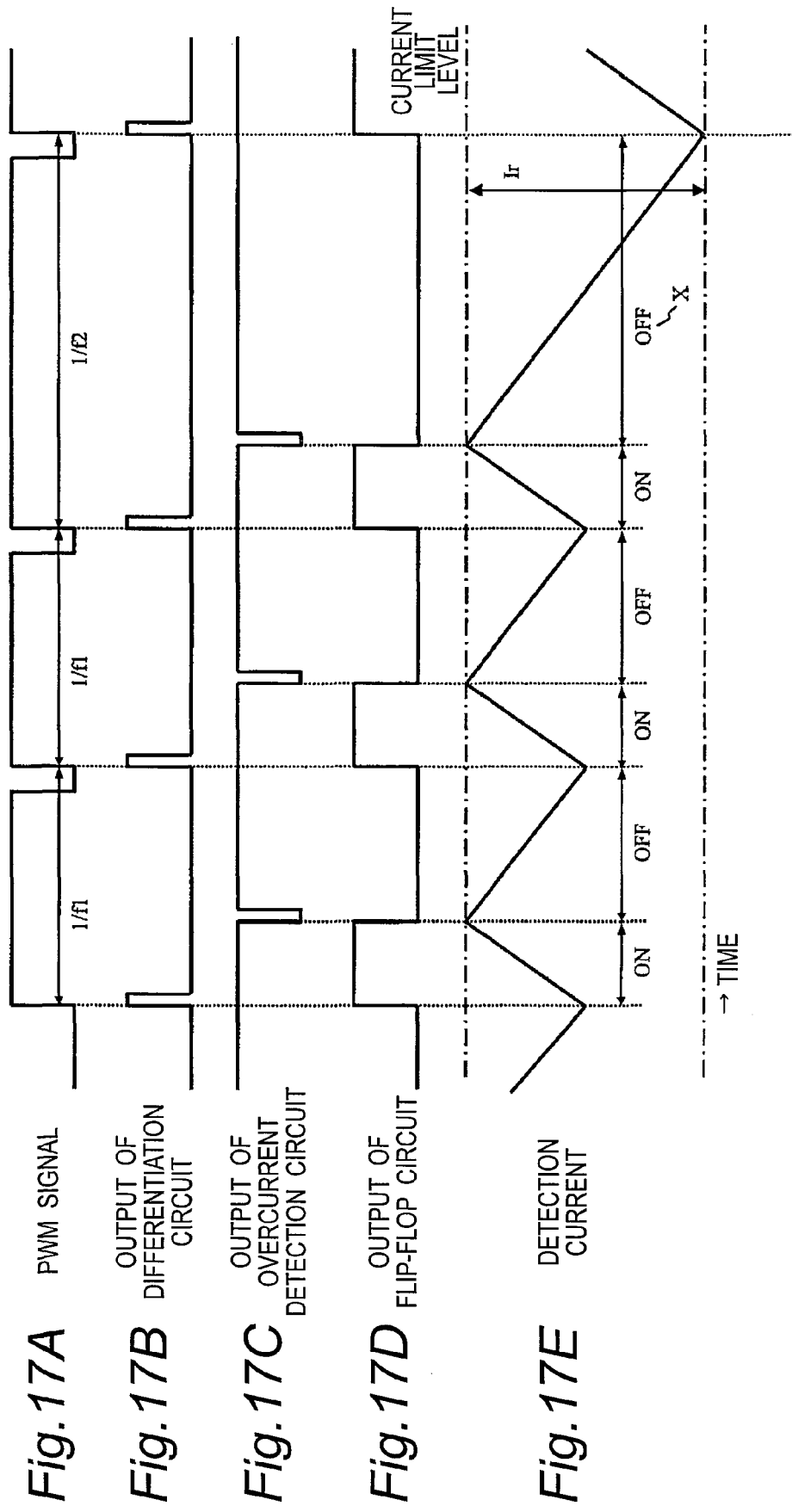

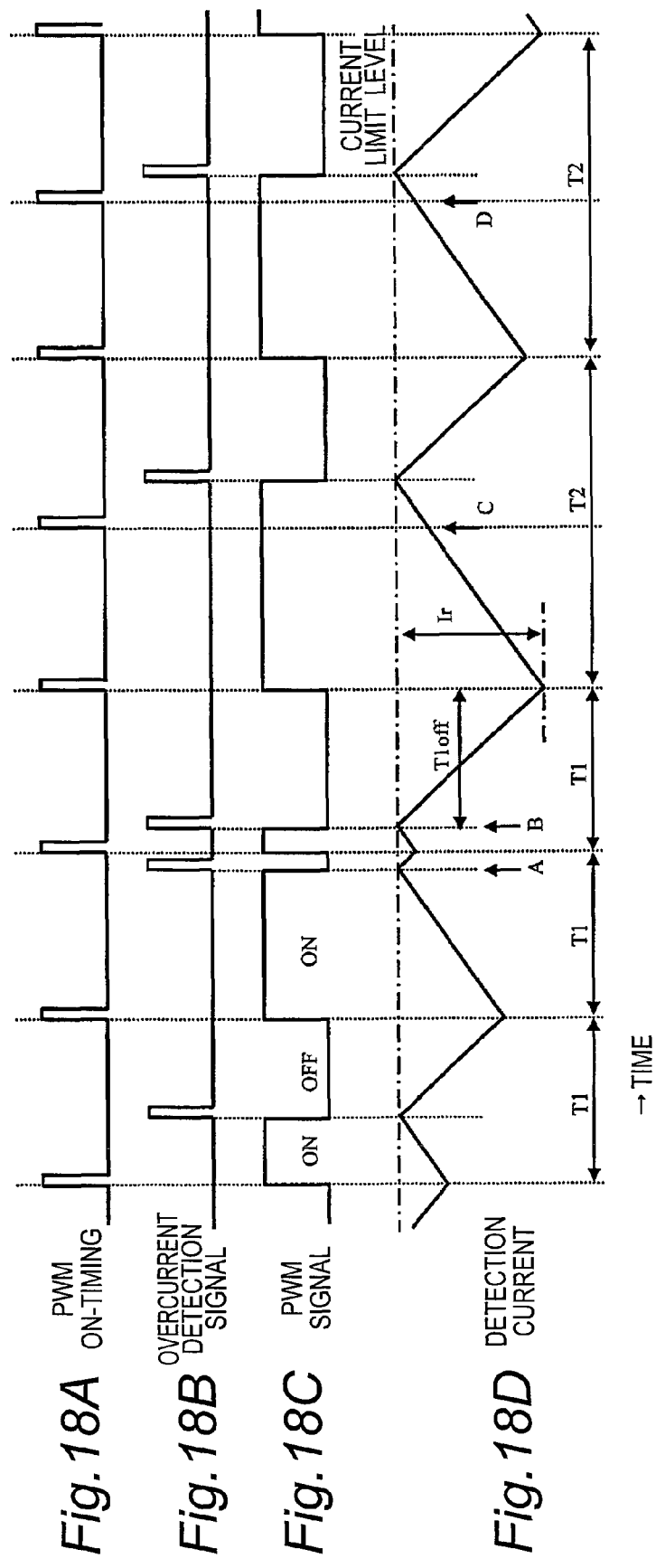

MOTOR DRIVE APPARATUS AND MOTOR DRIVE METHOD

BACKGROUND OF THE INVENTION

The present invention relates to a motor drive apparatus and a motor drive method capable of reducing noise by limiting a current peak value to a predetermined value or less and by smoothing the waveforms of drive currents during the current limitation.

FIG. 15 is a view showing the configuration of a conventional motor drive apparatus for providing overcurrent protection. The operation of the conventional motor drive apparatus will be described briefly referring to FIG. 15. A power supply unit 20 carries out switching operation depending on control signals coming from a drive circuit 400 and supplies power from a DC power supply 1 to a motor 5. The current flowing through the power supply unit 20 is detected by measuring the voltage across both terminals of a current detection resistor (shunt resistor) 100.

The current detection signal detected using the current detection resistor 100 is filtered using a filter comprising a resistor 61 and a capacitor 62 and input to a comparator 65. A signal indicating the divided voltage value obtained by dividing a reference voltage Vref using resistors 63 and 64 is input to the reference input terminal of the comparator 65. When the output of the filter rises to the above-mentioned divided voltage value or more, an overcurrent protection circuit 66 turns OFF all of the high-side drive transistors 21, 22 and 23 and the low-side drive transistors 25, 26 and 27 of the power supply unit 20, thereby shutting off the output and carrying out overcurrent protection.

The technology for carrying out overcurrent protection operation by filtering the current detection signal detected using the current detection resistor and by comparing the signal with the reference voltage as described above has been disclosed in, for example, International Publication Number WO 00/19591.

FIG. 16 is a view showing the configuration of another conventional motor drive apparatus equipped with an overcurrent protection function. The operation of the other conventional motor drive apparatus will be described briefly referring to FIG. 16. An overcurrent detection circuit 80 compares the current detection signal detected using a current detection resistor 100 with a reference voltage Vref. Upon detecting that the current detection signal has become higher than the reference voltage Vref, the overcurrent detection circuit 80 outputs an overcurrent detection signal to a flip-flop circuit 92. The overcurrent detection signal and a signal obtained by differentiating a pulse width modulation signal (PWM signal) output from a pulse width modulation circuit (PWM circuit) 90 using a differentiation circuit 91 are input to the flip-flop circuit 92. The flip-flop circuit 92 outputs a pulse signal synchronized with the PWM signal to an AND circuit 93. The AND circuit 93 ANDs the PWM signal output from the PWM circuit 90 and the pulse signal output from the flip-flop circuit 92 and outputs the result of the AND operation to a drive circuit 400. The drive circuit 400 shuts off the output of the motor drive apparatus depending on the output of the AND circuit 93, thereby carrying out overcurrent protection.

FIGS. 17A to 17E are timing charts illustrating the operation of the overcurrent protection in the conventional motor drive apparatus shown in FIG. 16. FIG. 17A shows the waveform of the PWM signal, FIG. 17B shows the waveform of the output signal of the differentiation circuit 91, FIG. 17C shows the waveform of the output signal of the overcurrent detection circuit 80, FIG. 17D shows the waveform of the output signal of the flip-flop circuit 92, and FIG. 17E shows the waveform of the detection current detected using the current detection resistor 100. The differentiation circuit 91 outputs pulses synchronized with the rising edges of the PWM signal of the PWM circuit 90. The detection current detected using the current detection resistor 100 increases during the ON period following the rising edge of the PWM signal. Upon detecting that the detection current has reached the current limit level, the overcurrent detection circuit 80 outputs a pulse. The flip-flop circuit 92 outputs a pulse signal that is set by the pulse output from the differentiation circuit 91 and reset by the pulse output from the overcurrent detection circuit 80 to the drive circuit 400. The output of the motor drive apparatus is shut off depending on this pulse signal, and overcurrent protection is performed. In other words, when the overcurrent detection circuit 80 detects an overcurrent, the conventional motor drive apparatus shown in FIG. 16 shuts off its output until the next rising edge of the PWM signal, whereby overcurrent protection operation is performed for each PWM cycle.

The technology in which the overcurrent protection operation is performed in synchronization with the PWM signal as described above has been disclosed in, for example, Japanese Patent Application Laid-Open Publication No. H 04-285427.

However, the conventional configuration (for example, International Publication Number WO 00/19591) described above and shown in FIG. 15 has the following problems.

The current detection signal includes high-frequency switching noise because of the effect of the high-frequency switching operation due to the pulse width modulation drive (PWM drive). In the above-mentioned conventional configuration comprising the filter, although the high-frequency switching noise can be eliminated by filtering, there is a fear of eliminating instantaneous overcurrent other than the high-frequency switching noise as noise. In other words, there is a fear that overcurrent detection accuracy lowers depending on the setting of the filtering constant. Furthermore, additional components, such as a resistor and a capacitor, constituting the filter are necessary separately. When an overcurrent is detected, all of the high-side drive transistors and the low-side drive transistors are turned OFF, whereby the output is shut off to perform overcurrent protection. For this reason, the decrease amounts of the drive currents during the shutoff of the output are very large and current ripples increase. As the current ripples increase, disturbances occur in the waveforms of the drive currents. Consequently, there is a problem that motor drive noise increases owing to the disturbances occurred in the waveforms of the drive currents when the overcurrent protection is performed as described above.

In addition, when the output is shut off in the conventional configuration, all the currents having been flowing to the motor side until that moment are regenerated to the power supply side. As a result, there is a fear that the power supply voltage is raised by the regenerated currents depending on the capability of the power supply and that the power supply voltage rises to the rated value or more in some cases. For this reason, in the conventional configuration, there is a fear of degrading or damaging devices, such as the drive transistors, although current limitation is performed. Furthermore, there is a problem of generating noise owing to the rising in power supply voltage.

In addition, the conventional configuration shown in FIG. 16 (for example, Japanese Patent Application Laid-Open Publication No. H 04-285427) has the following problems. Since the operation exiting from the overcurrent protection state is synchronized with the PWM signal, the waveforms of the drive currents during the overcurrent protection operation are susceptible to the PWM frequency. More specifically, as shown in FIGS. 17A to 17E, in particular, as the PWM frequency is lower (PWM frequency f1>f2), the PWM OFF period becomes longer (the period indicated by "X" in FIGS. 17A to 17E) in some cases, and the current ripples Ir in the waveforms of the drive currents increase accordingly. Furthermore, if the decrease amounts of the currents are large and abrupt current changes occur, this results in a problem of increasing noise.

FIGS. 18A to 18D are timing charts illustrating the operation of the conventional motor drive apparatus shown in FIG. 16 in the case that PWM drive is carried out while the PWM frequency is set constant. FIG. 18A shows the ON-timing of the PWM frequency being held constant, FIG. 18B shows the waveform of the output signal (overcurrent detection signal) of the overcurrent detection circuit 80, FIG. 18C shows the waveform of the PWM signal, and FIG. 18D shows the waveform of the detection current.

When PWM drive is carried out while the PWM frequency is set constant as shown in FIG. 18A, the PWM frequency becomes substantially lower than the setup frequency (owing to switching failure) in some cases depending on the timing of overcurrent detection. As a result, the PWM frequency having lowered is within the audible frequency range in some cases. More specifically, when the timing at which the detection current reaches the current limit level is immediately before the ON-timing of the PWM signal as shown at the time point indicated by arrow "A" in FIGS. 18A to 18D, the period to the next ON-timing of the PWM signal becomes short. As a result, the next overcurrent protection period (OFF period) becomes short. Consequently, the timing at which the detection current reaches the current limit level next time comes soon as shown at the time point indicated by arrow "B", and the OFF period (T1off) for overcurrent protection becomes longer. If the OFF period becomes longer, the timing at which the detection current reaches the current limit level next time passes the next ON-timing of the PWM signal, just like the time points indicated by arrows "C" and "D". As a result, the PWM cycle becomes longer (T1<T2), and the PWM frequency is lowered substantially. For example, if switching failure occurs once when PWM drive is carried out at a PWM frequency of 25 kHz, the substantial PWM frequency is 12.5 kHz. Consequently, the switching operation for the overcurrent protection is performed within the audible frequency range, and noise becomes larger. In addition, since the current ripples Ir also become larger, the waveforms of the drive currents are disturbed, and noise becomes larger. For these reasons, in the conventional configuration shown in FIG. 16 (for example, Japanese Patent Application Laid-Open Publication No. H 04-285427), as the current ripples in the waveforms of the drive currents increase, the waveforms of the drive currents are disturbed, and the PWM frequency is within the audible frequency range in some cases. Eventually, there is a problem of increasing noise during the overcurrent protection operation.

SUMMARY OF THE INVENTION

In view of the problems encountered in the conventional configurations described above, the present invention is intended to provide a motor, a motor drive apparatus, an optical disc apparatus and a motor drive method, capable of accurately detecting overcurrent by eliminating the effect of high-frequency switching noise using a simple low-cost configuration and capable of carrying out motor control with smooth drive current waveforms by decreasing current ripples while preventing the rising in power supply voltage during current limitation so that noise is reduced during the current limitation.

The motor drive apparatus according to the present invention comprises:

power supply means having a half-bridge circuit in which multiple-phase high-side drive transistors are connected in series with multiple-phase low-side drive transistors, respectively, and the respective connection points are used as the respective phase coil drive terminals of a motor, switching control means for pulse width modulation driving the power supply means using pulse width modulation signals, current detection means for detecting the current flowing through the power supply means, and current control means for outputting a current control signal for controlling the peak value of the detection current of the current detection means to a predetermined value or less, wherein the switching control means turns ON all of one-side drive transistors selected from the high-side drive transistors and the low-side drive transistors of the power supply means for a predetermined period, and turns OFF all of the other-side drive transistors for a predetermined period in response to the current control signal. The motor drive apparatus according to the present invention configured as described above can accurately detect overcurrent by eliminating the effect of high-frequency switching noise using a simple low-cost configuration and can carry out motor drive control with smooth drive current waveforms while preventing the rising in power supply voltage during current limitation so that noise is reduced during the current limitation. The power supply means, the switching control means, the current detection means and the current control means are described in embodiments described later by taking a power supply unit, a switching controller, a current detector and a current controller as examples.

Furthermore, the motor drive apparatus according to the present invention comprises:

power supply means having a half-bridge circuit in which multiple-phase high-side drive transistors are connected in series with multiple-phase low-side drive transistors, respectively, and the respective connection points are used as the respective phase coil drive terminals of a motor, switching control means for pulse width modulation driving the power supply means using pulse width modulation signals, current detection means for detecting the current flowing through the power supply means, and current control means for outputting a current control signal for controlling the peak value of the detection current of the current detection means to a predetermined value or less, wherein the switching control means turns ON all of one-side drive transistors selected from the high-side drive transistors and the low-side drive transistors of the power supply means, and turns OFF all of the other-side drive transistors in response to the current control signal to carry out current limitation so that the current decrease amount during the current limitation period is not more than a predetermined amount. The motor drive apparatus according to the present invention configured as described above can accurately detect overcurrent by eliminating the effect of high-frequency switching noise using a simple low-cost configuration and can carry out motor drive control with smooth drive current waveforms by decreasing current ripples while preventing the rising in power supply voltage during the current limitation so that noise is reduced during the current limitation.

By the use of the motor drive apparatus configured as described above for an optical disc apparatus, noise during the current limitation is reduced, and there is no fear of degrading or damaging devices owing to the rising in power supply voltage. As a result, it is possible to provide an optical disc apparatus being low in noise and high in reliability.

The motor according to the present invention comprises:

a motor section having multiple-phase coils and a rotor, power supply means having a half-bridge circuit in which respective phase high-side drive transistors are connected in series with respective phase low-side drive transistors, respectively, and the connection points are used as the respective phase coil drive terminals of the motor section, switching control means for pulse width modulation driving the power supply means using pulse width modulation signals, current detection means for detecting the current flowing through the power supply means, and current control means for outputting a current control signal for controlling the peak value of the detection current of the current detection means to a predetermined value or less, wherein the switching control means turns ON all of one-side drive transistors selected from the high-side drive transistors and the low-side drive transistors of the power supply means for a predetermined period, and turns OFF all of the other-side drive transistors for a predetermined period in response to the current control signal. The motor according to the present invention configured as described above can accurately detect overcurrent by eliminating the effect of high-frequency switching noise using a simple low-cost configuration and can carry out motor drive control with smooth drive current waveforms while preventing the rising in power supply voltage during current limitation so that noise is reduced during the current limitation.

Furthermore, the motor according to the present invention comprises:

a motor section having multiple-phase coils and a rotor, power supply means having a half-bridge circuit in which respective phase high-side drive transistors are connected in series with respective phase low-side drive transistors, respectively, and the connection points are used as the respective phase coil drive terminals of the motor section, switching control means for pulse width modulation driving the power supply means using pulse width modulation signals, current detection means for detecting the current flowing through the power supply means, and current control means for outputting a current control signal for controlling the peak value of the detection current of the current detection means to a predetermined value or less, wherein the switching control means turns ON all of one-side drive transistors selected from the high-side drive transistors and the low-side drive transistors of the power supply means, and turns OFF all of the other-side drive transistors in response to the current control signal to carry out current limitation so that the current decrease amount during the current limitation is not more than a predetermined amount. The motor according to the present invention configured as described above can accurately detect overcurrent by eliminating the effect of high-frequency switching noise using a simple low-cost configuration and can carry out motor drive control with smooth drive current waveforms by decreasing current ripples while preventing the rising in power supply voltage during current limitation so that noise is reduced during the current limitation.

By the use of the motor configured as described above for an optical disc apparatus, noise during the current limitation is reduced, and there is no fear of degrading or damaging devices owing to the rising in power supply voltage. As a result, it is possible to provide an optical disc apparatus being low in noise and high in reliability.

The motor drive method according to the present invention comprises:

a switching control step of carrying out pulse width modulation drive using pulse width modulation signals, a current detection step of detecting the current flowing through a motor, and a current control step of outputting a current control signal for controlling the peak value of the detection current detected at the current detection step to a predetermined value or less, wherein the current control step comprises:

a comparison step of comparing the detection current detected at the current control step with a reference value, a noise elimination step of outputting a noise elimination signal for prohibiting current detection in a first period in synchronization with the edges of the pulse width modulation signals, and a current control signal output step of using the synthesized signal of the signal output at the comparison step and the noise elimination signal as an overcurrent detection signal and outputting the current control signal for limiting current for a predetermined period from the rising time point of the overcurrent detection signal, and the switching control step turns ON all of one-side drive transistors selected from the high-side drive transistors and the low-side drive transistors, and turns OFF all of the other-side drive transistors in response to the current control signal. The motor drive method according to the present invention configured as described above can accurately detect overcurrent by eliminating the effect of high-frequency switching noise using a simple low-cost configuration and can carry out motor drive control with smooth drive current waveforms while preventing the rising in power supply voltage during current limitation so that noise is reduced during the current limitation.

Furthermore, the motor drive method according to the present invention comprises:

a switching control step of carrying out pulse width modulation drive using pulse width modulation signals, a current detection step of detecting the current flowing through a motor, and a current control step of outputting a current control signal for controlling the peak value of the detection current detected at the current detection step to a predetermined value or less, wherein the current control step comprises:

a comparison step of comparing the detection current detected at the current control step with a reference value, a noise elimination step of outputting a noise elimination signal for prohibiting current detection in a first period in synchronization with the edges of the pulse width modulation signals, and a current control signal output step of using the synthesized signal of the signal output at the comparison step and the noise elimination signal as an overcurrent detection signal and outputting the current control signal for limiting current for a period from the rising time point of the overcurrent detection signal until the current decrease amount exceeds a predetermined amount, and the switching control step turns ON all of one-side drive transistors selected from the high-side drive transistors and the low-side drive transistors, and turns OFF all of the other-side drive transistors in response to the current control signal. The motor drive method according to the present invention configured as described above can accurately detect overcurrent by eliminating the effect of high-frequency switching noise using a simple low-cost configuration and can carry out motor drive control with smooth drive current waveforms by decreasing current ripples while preventing the rising in power supply voltage during current limitation so that noise is reduced during the current limitation.

The motor drive apparatus and the motor drive method according to the present invention can accurately detect overcurrent by eliminating the effect of high-frequency switching noise using a simple low-cost configuration. Furthermore, since the overcurrent protection operation is carried out by performing the so-called short-circuit braking operation in which all of one-side drive transistors selected from the high-side drive transistors and the low-side drive transistors are turned ON, and all of the other-side drive transistors are turned OFF during the overcurrent protection period, no regenerated current flows to the power supply unit during the current limitation, and the power supply voltage can be suppressed from rising. Hence, there is no fear of causing accidents, such as device degradation and damage, owing to the rising in power supply voltage. Moreover, since the short-circuit braking operation period is set to a predetermined period or set so that the current decrease amount is a predetermined amount or less during the current limitation, it is possible to attain smooth current control with small ripples and scarce disturbances in the current waveforms and to reduce noise during the current limitation. A drive source having higher reliability can be structured by incorporating the configuration of the motor drive apparatus according to the present invention into a motor, and a highly reliable optical disc apparatus with low noise can be provided by applying the configuration of the motor drive apparatus according to the present invention to an optical disc apparatus.

While the novel features of the invention are set forth particularly in the appended claims, the invention, both as to organization and content, will be better understood and appreciated, along with other objects and features thereof, from the following detailed description taken in conjunction with the drawings.

Specific configurations and operations according to the present invention will be described in detail referring to embodiments described hereafter.

BRIEF DESCRIPTION OF THE DRAWINGS

FIGS. 3A to 3H are timing charts illustrating the operations of the various sections of a noise eliminator in the current controller shown in FIG. 2;

FIGS. 4A to 4D are timing charts illustrating the operations of the various sections of the current controller shown in FIG. 2;

FIGS. 17A to 17E are the timing charts illustrating the operation of the conventional motor drive apparatus shown in FIG. 16; and FIGS. 18A to 18D are the timing charts illustrating the other operation of the conventional motor drive apparatus shown in FIG. 16.

It will be recognized that some or all of the Figures are schematic representations for purposes of illustration and do not necessarily depict the actual relative sizes or locations of the elements shown.

DETAILED DESCRIPTION OF THE PREFERRED EMBODIMENTS

Preferred embodiments of a motor drive apparatus and a motor drive method, and a motor and an optical disc apparatus incorporating the configuration of the motor drive apparatus according to the present invention will be described below referring to the accompanying drawings.

Embodiment 1

Figure 1:
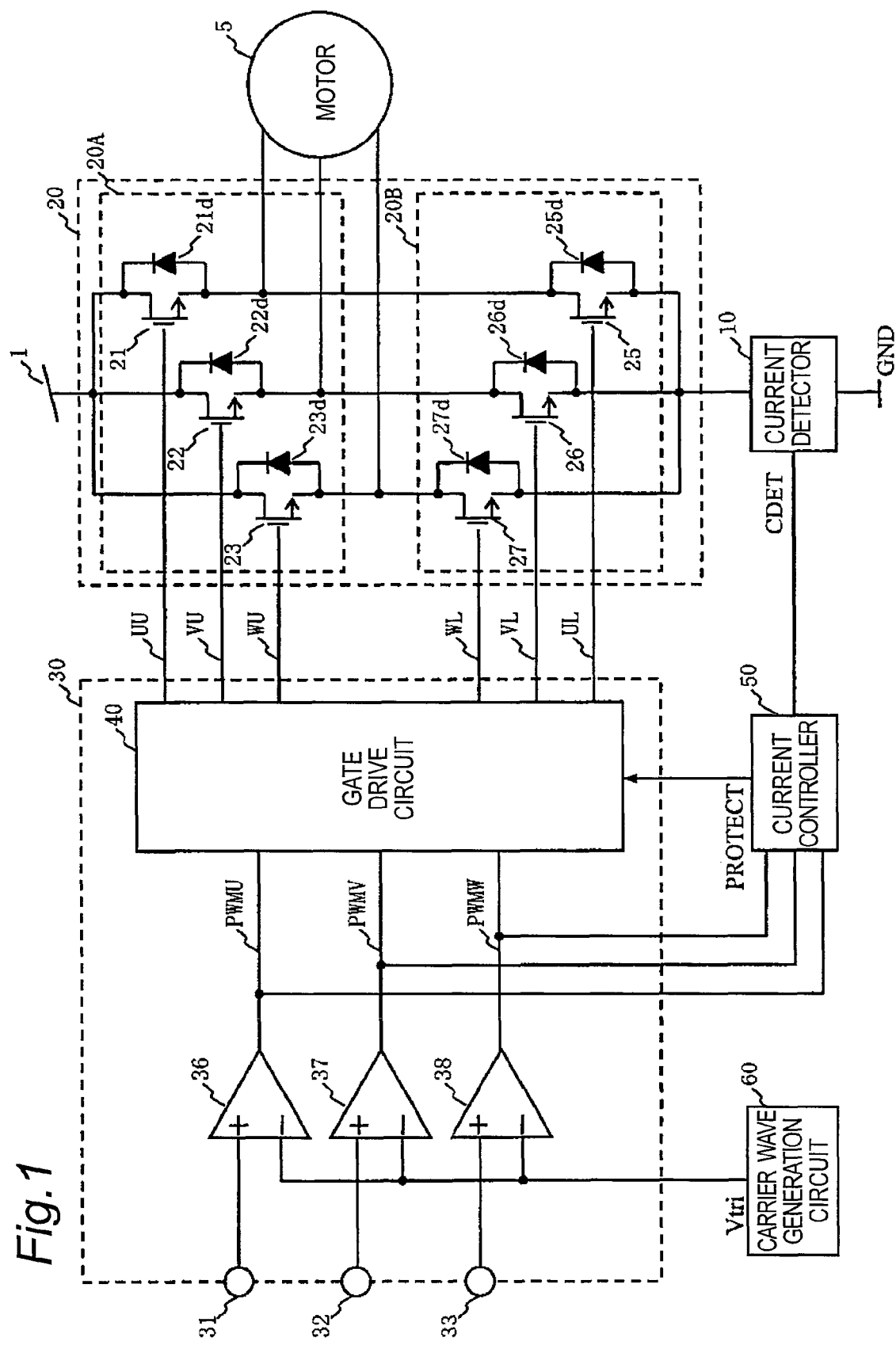
FIG. 1 is a view showing the overall configuration of a motor drive apparatus according to Embodiment 1 of the present invention.

A motor drive apparatus and a motor drive method according to Embodiment 1 of the present invention will be described referring to FIGS. 1 to 11. FIG. 1 is a view showing the overall configuration of the motor drive apparatus according to Embodiment 1.

A power supply unit 20 serving as power supply means has a three-phase bridge configuration. One terminal of the power supply unit 20 is connected to a DC power supply 1, and the other terminal thereof is grounded (GND) via a current detector 10. The power supply unit 20 configured as described above carries out switching operation using gate control signals UU, VU, WU, UL, VL and WL coming from a switching controller 30, thereby supplying AC power to a motor 5. The motor 5 comprises a rotor (not shown) having a magnetic field section formed of permanent magnets and a stator (not shown) in which three-phase coils are Y-connected.

The power supply unit 20 comprises a three-phase high-side drive transistor group 20A consisting of high-side drive transistors 21, 22 and 23 and high-side freewheeling diodes 21d, 22d and 23d connected in parallel therewith, respectively, and a three-phase low-side drive transistor group 20B consisting of low-side drive transistors 25, 26 and 27 and low-side freewheeling diodes 25d, 26d and 27d connected in parallel therewith, respectively. The high-side drive transistor group 20A is connected to the low-side drive transistor group 20B in series. Three-phase drive terminals from the motor 5 are connected to the respective connection points between the high-side drive transistor group 20A and the low-side drive transistor group 20B. Embodiment 1 will be described by taking an example in which the drive transistors are formed of N-channel field-effect transistors. However, the present invention is not limited to this kind of configuration. In addition, the freewheeling diodes are the parasitic diodes of the field-effect transistors.

The switching controller 30 comprises input terminals 31, 32 and 33, comparators 36, 37 and 38, and a gate drive circuit 40. Three-phase signals (for example, three-phase sinusoidal wave signals) coming from a signal generation circuit, not shown, are input to the input terminals 31, 32 and 33. The three-phase signals and a high-frequency carrier wave signal (for example, a triangular wave signal Vtri: 20 to 300 kHz) coming from a carrier wave generation circuit 60 are input to the comparators 36, 37 and 38. The comparators 36, 37 and 38 carry out pulse width modulation and output three-phase PWM signals (PWMU, PWMV and PWMW) to the gate drive circuit 40 and a current controller 50 serving as current control means. The switching controller 30 may have a configuration in which two-phase modulation using two comparators is performed, instead of the configuration in which three-phase signals are pulse width modulated as in Embodiment 1. Furthermore, the three-phase signals to be input to the input terminals 31, 32 and 33 are not limited to have sinusoidal waveforms, but may have trapezoidal waveforms or waveforms with less than 180 degree current conduction. Still further, the various signals are not limited to have linear waveforms changing continuously and smoothly, but may have stepwise waveforms, such as those output by D/A conversion.

The gate drive circuit 40 carries out PWM drive by subjecting the respective drive transistors of the power supply unit 20 to high-frequency switching operation in response to the three-phase PWM signals (PWMU, PWMV and PWMW).

To the gate drive circuit 40, the current controller 50 outputs a current control signal PROTECT for carrying out current limitation (current peak value control) using a current detection signal CDET coming from the current detector 10 serving as current detection means and the three-phase PWM signals (PWMU, PWMV and PWMW). The gate drive circuit 40 turns OFF the high-side drive transistor group 20A of the power supply unit 20 and turns ON the low-side drive transistor group 20B for only a predetermined period in response to the current control signal PROTECT. The gate drive circuit 40 carries out current limitation by setting the power supply unit 20 to the so-called short-circuit braking state. The detailed operations of the gate drive circuit 40 and the current controller 50 will be described later.

The detailed operations of the various sections of the motor drive apparatus according to Embodiment 1 will be described below.

Figure 2:
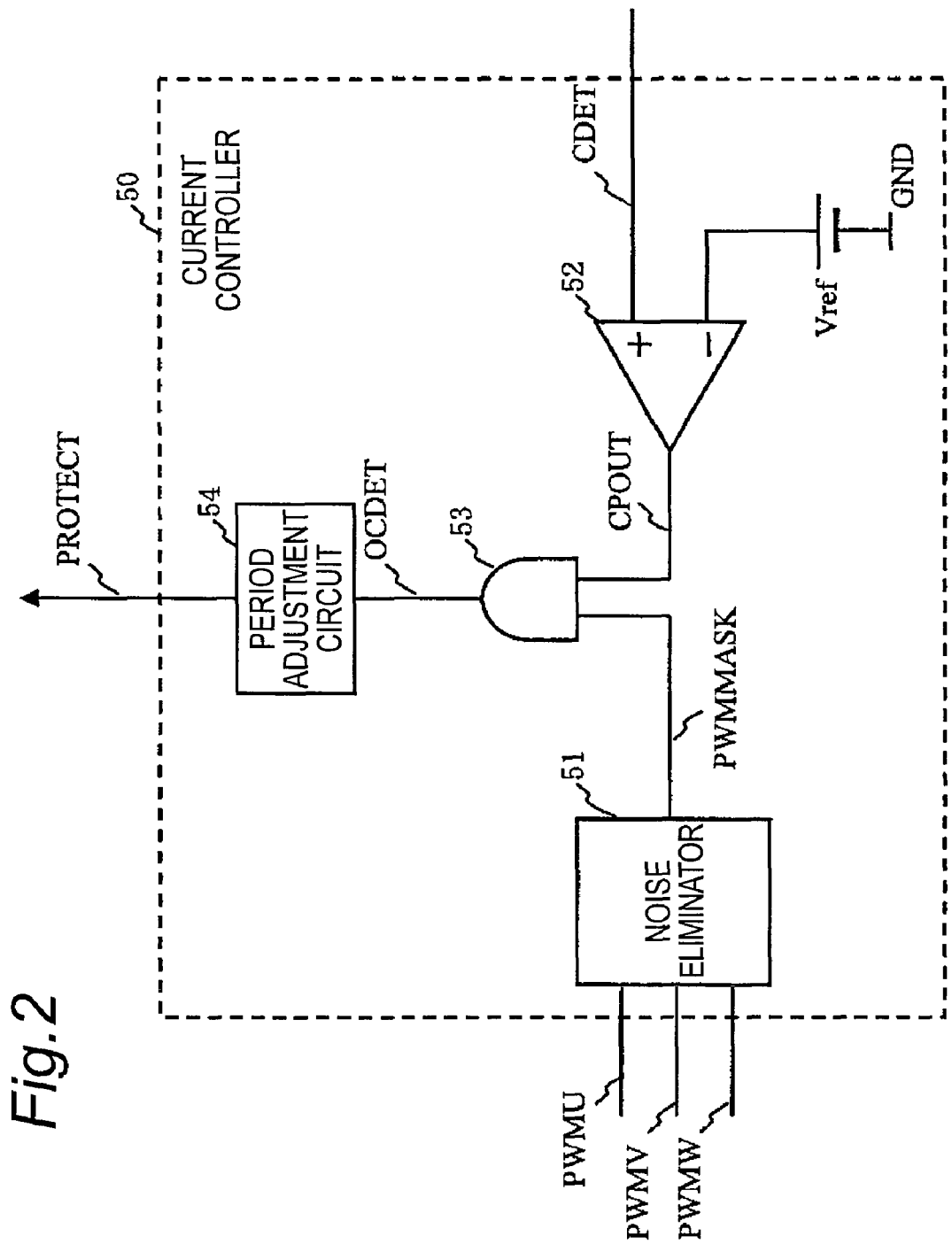
FIG. 2 is a view showing the circuit configuration of a current controller in the motor drive apparatus according to Embodiment 1.

FIG. 2 is a view showing a specific configuration of the current controller 50. The current controller 50 comprises a noise eliminator 51 serving as noise elimination means, a reference voltage supply (reference voltage: Vref), a comparator 52 serving as comparison means, an AND circuit 53 and a period adjustment circuit 54. The three-phase PWM signals (PWMU, PWMV and PWMW) are input to the noise eliminator 51. The noise eliminator 51 generates a PWM mask signal PWMMASK that is used to eliminate the effect of high-frequency switching noise generated by the high-frequency switching operation and outputs the signal to the AND circuit 53.

FIGS. 3A to 3H are timing charts illustrating the operation of the noise eliminator 51. FIG. 3A shows the waveforms of the three-phase signals and the triangular wave signal Vtri coming from the carrier wave generation circuit 60, FIGS. 3B to 3D show the waveforms of the three-phase PWM signals (PWMU, PWMV and PWMW), (e) to (g) show the waveforms of PWMUM, PWMVM and PWMWM, and (h) shows the waveform of the PWM mask signal PWMMASK. The three-phase PWM signals (PWMU, PWMV and PWMW) are singles obtained by comparing the three-phase signals with the high-frequency carrier wave signal Vtri. PWMUM shown in FIG. 3E is a signal that becomes "L" level for a predetermined period Ta from the respective edges of the U-phase PWM signal PWMU. Similarly, PWMVM and PWMWM shown in FIGS. 3F and 3G are signals that become "L" level for the predetermined period Ta from the respective edges of the V-phase PWM signal PWMV and the W-phase PWM signal PWMW. The PWM mask signal PWMMASK shown in FIG. 3H is a synthesized signal of PWMUM, PWMVM and PWMWM and becomes "L" level for the predetermined period Ta from the respective edges of the PWM signals for the respective phases. High-frequency switching noise that is generated when the respective drive transistors of the power supply unit 20 perform high-frequency switching operation is eliminated using the PWM mask signal PWMMASK that becomes "L" level for the predetermined period Ta from the respective edges of the PWM signals for the respective phases.

FIGS. 4A to 4D are timing charts illustrating the operations of the various sections of the current controller 50. The current detection signal CDET shown in of FIG. 4A is a signal including beard-shaped high-frequency switching noise and such ringing as shown in a broken line circle, such noise being generated at the rising time by the high-frequency switching operation. The current detection signal CDET is input to one input terminal (+) of the comparator 52 in the current controller 50. The reference voltage Vref is input to the other input terminal (−) of the comparator 52. The current detection signal CDET is a signal obtained by detecting the total current flowing through the power supply unit 20. When it is assumed that the resistance of the current detector 10 is Rcs and that the above-mentioned total current is Ig, the current detection signal CDET has a voltage value obtained by performing the calculation of Rcs×Ig. The comparator 52 outputs an output signal CPOUT (see FIG. 4B) that becomes "H" level when the current detection signal CDET becomes higher than the reference voltage Vref (corresponding to the current limit level). At this time, since the current detection signal CDET includes high-frequency switching noise that is generated by the high-frequency switching operation, the output signal CPOUT of the comparator 52 is a signal in which even the high-frequency switching noise is converted into pulses. The output signal CPOUT is input to one input terminal of the AND circuit 53, and the PWM mask signal PWMMASK (see FIG. 4C) is input to the other input terminal.

The AND circuit 53 ANDs the PWM mask signal PWM-MASK of the noise eliminator 51 and the output signal CPOUT of the comparator 52, and outputs an overcurrent detection signal OCDET (see FIG. 4D) to the period adjustment circuit 54. This makes it possible to eliminate the high-frequency switching noise that is generated when the respective drive transistors of the power supply unit 20 perform high-frequency switching operation, and to detect the timing at which the current detection signal reaches the current limit level without the effect of the high-frequency switching noise.

Figures 5A, 5B, 5C:
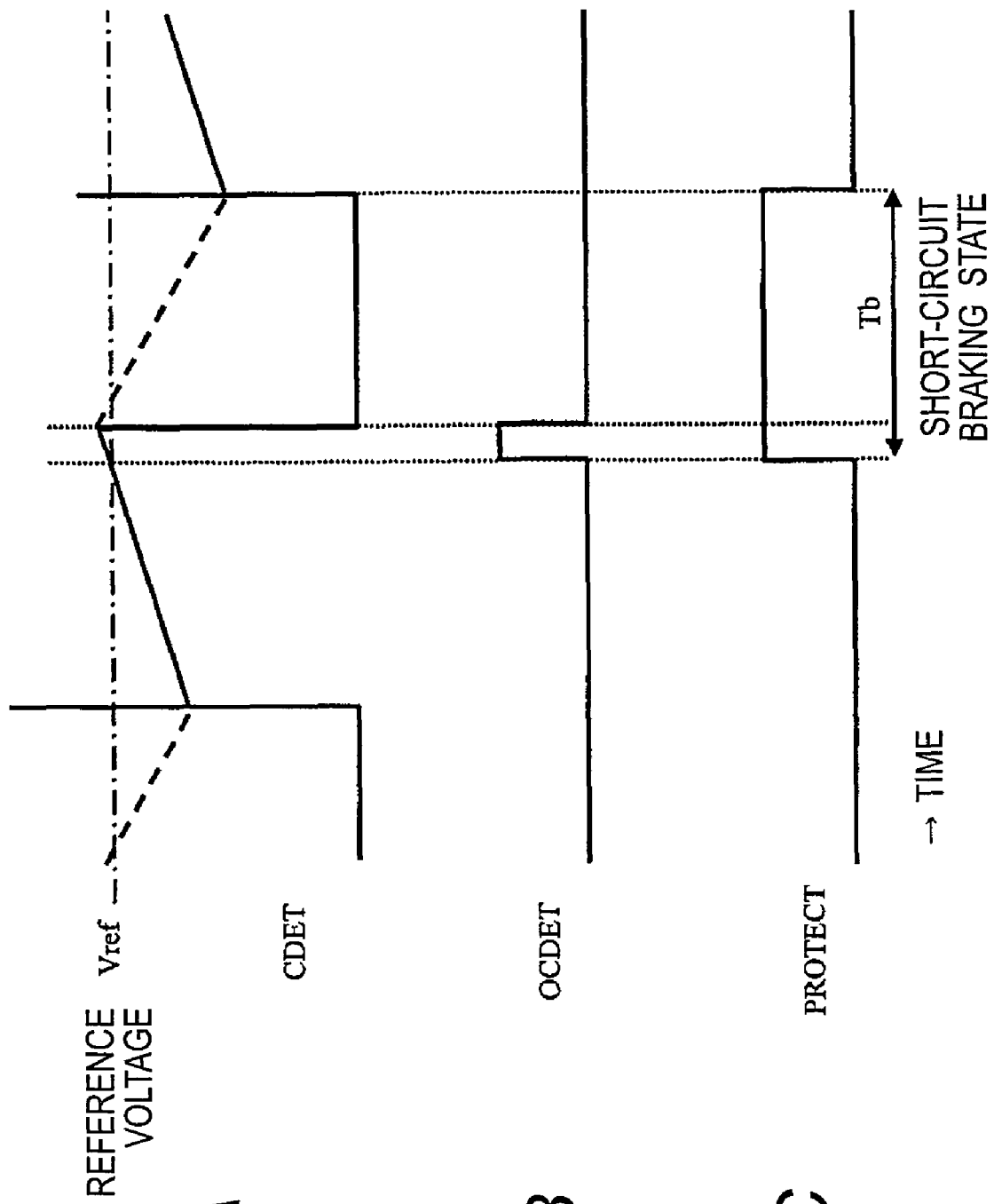
FIGS. 5A to 5C are timing charts illustrating the operations of the various sections of the current controller shown in FIG. 2.

The period adjustment circuit 54 outputs a current control signal PROTECT that becomes "H" level for only a predetermined period Tb from the rising edge of the overcurrent detection signal OCDET of the AND circuit 53. The gate drive circuit 40 turns OFF the high-side drive transistor group 20A of the power supply unit 20 and turns ON the low-side drive transistor group 20B in response to the current control signal PROTECT. The gate drive circuit 40 carries out current peak value control by making the power supply unit 20 perform the so-called short-circuit braking operation (see FIGS. 5A to 5C). FIGS. 5A to 5C are timing charts showing the current detection signal CDET (see FIG. 5A) output from the current detector 10, the overcurrent detection signal OCDET (see FIG. 5B) output from the AND circuit 53, and the current control signal PROTECT (see FIG. 5C) output from the period adjustment circuit 54.

As described above, the current limit level reaching timing of the current flowing through the power supply unit 20 can be detected by monitoring the peak value of the current detection signal CDET while eliminating the effect of the high-frequency switching noise. Hence, the reference voltage Vref should only be set to the voltage value obtained by the calculation using the current limit level and the resistance Rcs of the current detector 10.

In the case that the effect of the high-frequency switching noise was unable to be eliminated and if the current peak value control is carried out using the output signal CPOUT of the comparator 52 in which even the high-frequency switching noise is converted into pulses, the generation timing of the above-mentioned beard-shaped high-frequency switching noise owing to the high-frequency switching noise is detected as the current limit level reaching timing. As a result, the operation is shifted to the short-circuit braking operation at the wrong timing, the current peak value control cannot be carried out, and the operation becomes unstable. Since the beard-shaped high-frequency switching noise and the ringing are generated in synchronization with the ON/OFF timing of the PWM signals (PWMU, PWMV and PWMW), the "L" level period Ta of the PWM mask signal PWMMASK is required to be set to a period longer than the generation period of the beard-shaped high-frequency switching noise and the generation period of the ringing.

Figure 6:
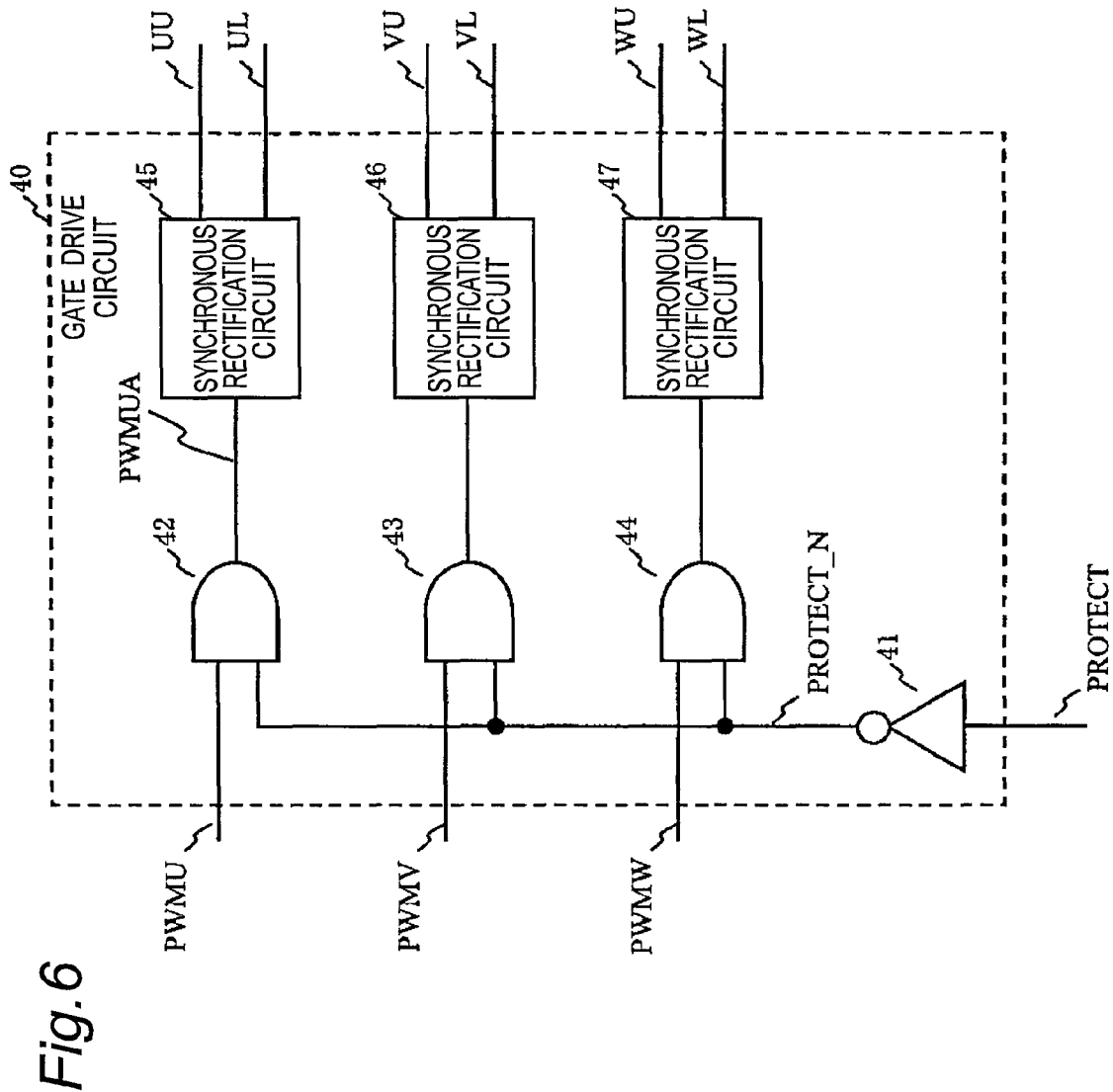
FIG. 6 is a view showing the circuit configuration of a gate drive circuit in the motor drive apparatus according to Embodiment 1.
Figure 7:
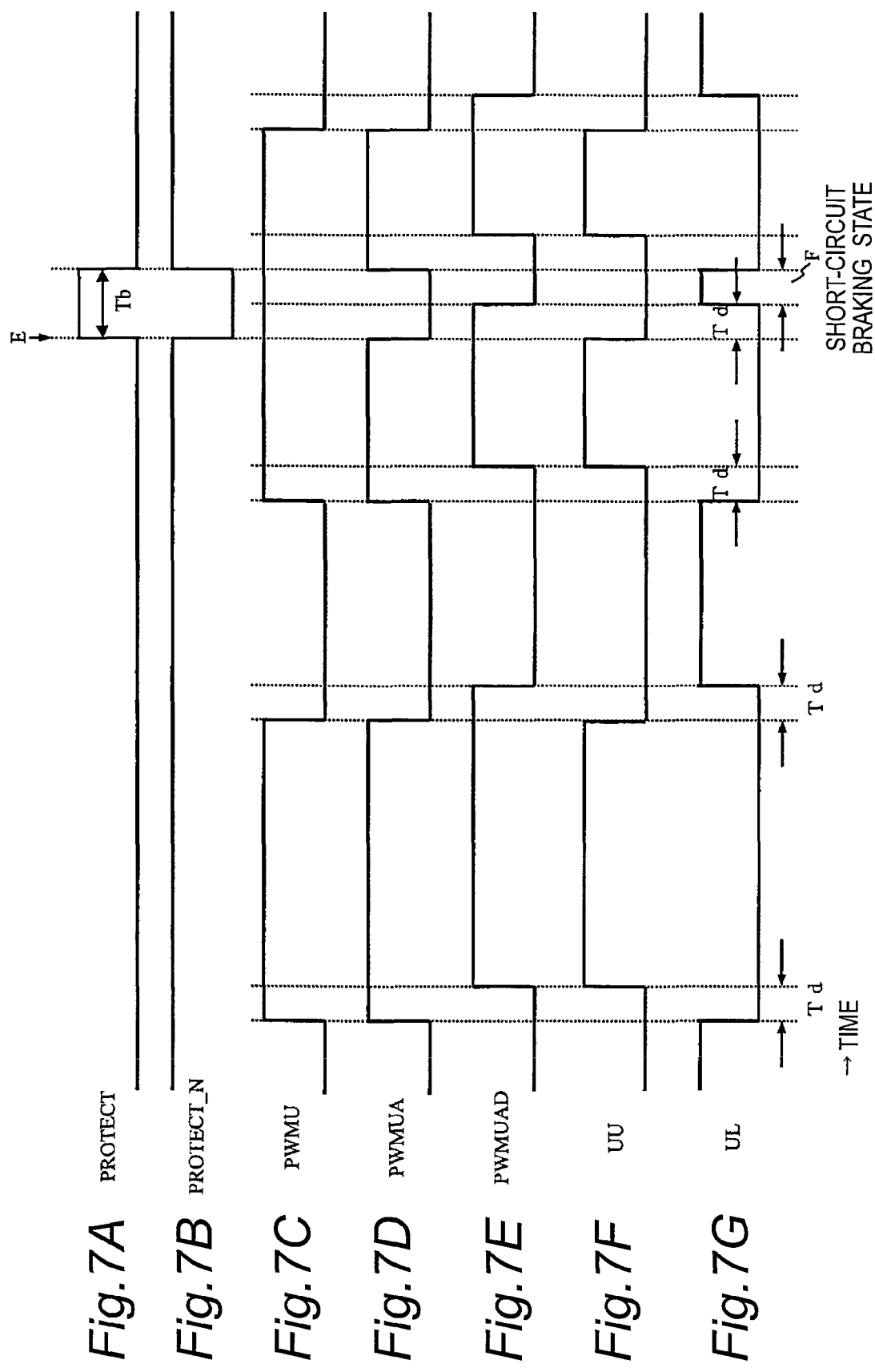
FIGS. 7A to 7G are timing charts illustrating the operations of the various sections of the gate drive circuit shown in FIG. 6.
Figure 8:
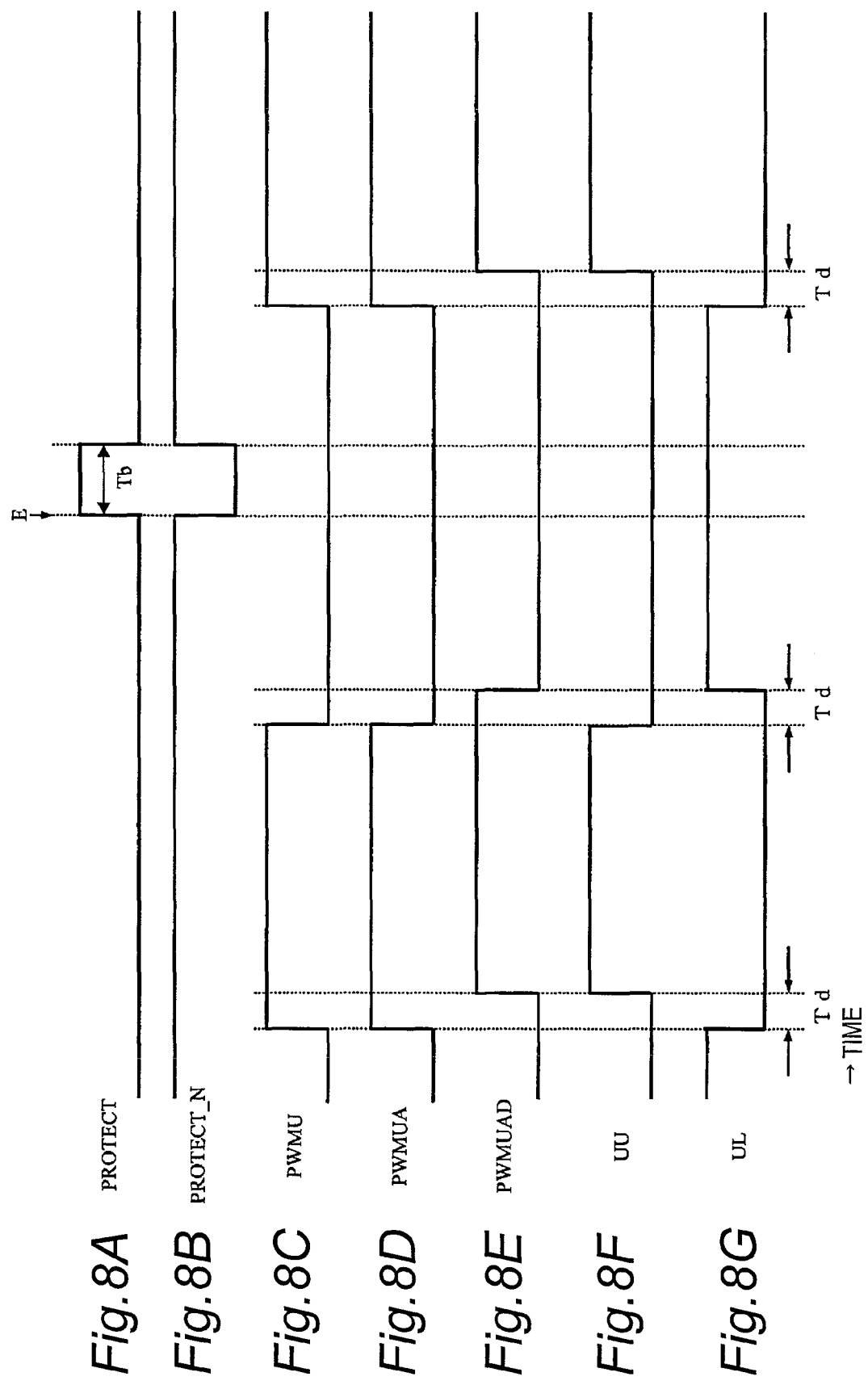
FIGS. 8A to 8G are other timing charts illustrating the operations of the various sections of the gate drive circuit shown in FIG. 6.

FIG. 6 is a view showing the configuration of the gate drive circuit 40 in the motor drive apparatus according to Embodiment 1. FIGS. 7A to 7G are timing charts illustrating the operations of the various sections of the gate drive circuit 40 at the time when the current control signal PROTECT is input to the gate drive circuit 40. The gate drive circuit 40 comprises an inverter circuit 41, AND circuits 42, 43 and 44 for the respective phases, and synchronous rectification circuits 45, 46 and 47 for the respective phases. The PWM signals for the respective phases from the comparators 36, 37 and 38 are input to one input terminals of the AND circuits 42, 43 and 44, respectively. Furthermore, the current control signal PROTECT coming from the current controller 50 is input to the other input terminals of the AND circuits 42, 43 and 44 via the inverter circuit 41.

Next, the operation of the gate drive circuit 40 will be described in detail referring to FIGS. 7A to 7G. Although FIGS. 7A to 7G show only the high-side gate control signal UU and the low-side gate control signal UL generated from the U-phase PWM signal PWMU, similar operations are also carried out for the V and W phases. When the current control signal PROTECT (see FIG. 7A) is "L" level, that is, when the current detection signal CDET is lower than the reference voltage Vref (when the detection current is less than the current limit level), the output (PROTECT_N shown in FIG. 7B) of the inverter circuit 41 becomes "H" level. Hence, the AND circuit 42 outputs the U-phase PWM signal that has been input thereto (see FIG. 7D) without change. The output of the AND circuit 42 is input to the synchronous rectification circuit 45. To the power supply unit 20, the synchronous rectification circuit 45 outputs the high-side gate control signal UU (see FIG. 7F) for drive-controlling the high-side drive transistor 21 and outputs the low-side gate control signal UL (see FIG. 7G) for drive-controlling the low-side drive transistor 25. The high-side gate control signal UU and the low-side gate control signal UL are gate control signals that carry out synchronous rectification and are provided with dead time Td to prevent flow-through operation in which the signals are turned ON simultaneously. The signal PWMUAD shown in FIG. 7E is a signal obtained by delaying the signal PWMUA by the dead time Td to form the gate control signals provided with the dead time Td.

Next, when the current control signal PROTECT becomes "H" level, that is, when the current detection signal CDET reaches the reference voltage Vref or more (when the detection current becomes the current limit level or more at the timing of time point E of the current control signal PROTECT (see FIG. 7A)), the output of the inverter circuit 41 becomes "L" level for only the predetermined period Tb. Hence, the AND circuit 42 outputs the signal PWMUA (see FIG. 7D) obtained by synthesizing the U-phase PWM signal PWMU (see FIG. 7C) having been input thereto with the inverted current control signal PROTECT_N (see FIG. 7B). As a result, the synthesized signal (PWMUA) is a signal obtained when a signal being "L" level for only the predetermined period Tb cuts into the U-phase PWM signal PWMU. The above-mentioned synthesized signal PWMUA is input to the synchronous rectification circuit 45, and the synchronous rectification circuit 45 outputs the high-side gate control signal UU and the low-side gate control signal UL just as in the case that the current control signal PROTECT is "L" level. At this time, the high-side gate control signal UU becomes "L" level during the predetermined period Tb in which the current control signal PROTECT becomes "H" level and turns OFF the U-phase high-side drive transistor 21. On the other hand, the low-side gate control signal UL becomes "H" level and turns ON the U-phase low-side drive transistor 25. Similarly, in each of the V and W phases, the corresponding high-side drive transistor is turned ON and the corresponding low-side drive transistors is turned OFF simultaneously at the timing at which the current control signal PROTECT becomes "H" level (at the timing of time point E shown in FIG. 7A). Hence, when the current control signal PROTECT becomes "H" level, that is, when the current detection signal CDET reaches the reference voltage Vref or more (at the timing of time point E shown in FIG. 7A), the high-side drive transistor group 20A of the power supply unit 20 is turned OFF, the low-side drive transistor group 20B is turned ON, and the so-called short-circuit braking state (the period F shown in FIG. 7G) is attained. In the operation shown in FIGS. 7A to 7G, the short-circuit braking state is attained after the dead time Td from the timing of time point E. This prevents flow-through operation in which the high-side drive transistor and the low-side drive transistor are turned ON simultaneously when the operation state is shifted to the short-circuit braking state.

The timing chart shown in FIGS. 7A to 7G are timing charts applicable in the case that the current control signal PROTECT (see FIG. 7A) becomes "H" level during the ON period of the U-phase PWM signal PWMU (see FIG. 7C). On the other hand, the timing charts shown in FIGS. 8A to 8G are timing charts applicable in the case that the current control signal PROTECT becomes "H" level during the OFF period of the U-phase PWM signal PWMU. In FIGS. 8A to 8G, just like FIGS. 7A to 7G, FIG. 8A shows the waveform of the current control signal PROTECT, FIG. 8B shows the waveform of the inverted current control signal PROTECT_N, FIG. 8C shows the waveform of the U-phase PWM signal PWMU, FIG. 8D shows the waveform of the synthesized signal PWMUA, FIG. 8E shows the waveform of the dead time forming signal PWMUAD, FIG. 8F shows the waveform of the high-side gate control signal UU, and FIG. 8G shows the waveform of the low-side gate control signal UL.

The fact that the current control signal PROTECT (see FIG. 8A) becomes "H" level while the U-phase PWM signal PWMU (see FIG. 8C) is OFF means that the PWM signal for at least one of the V and W phases instead of the U phase is ON and that at least one of the V and W phases is in the state shown in FIGS. 7A to 7G.

As shown in FIGS. 8A to 8G, the high-side gate control signal UU and the low-side gate control signal UL maintain the same states as those during the normal operation even when the current control signal PROTECT becomes "H" level while the U-phase PWM signal PWMU is OFF. In other words, since the low-side drive transistor has already been turned ON while the PWM signal is OFF, the states of the signals remain unchanged and they are not required to be changed to new states using the current control signal PROTECT. Hence, in the motor drive apparatus and the motor drive method according to Embodiment 1, it is not necessary to carry out state switching wherein a dead time in which all the three-phase drive transistors are OFF is set in response to the "H" level of the current control signal PROTECT to prevent flow-through operation of the drive transistors so that the operation is shifted to the short-circuit braking operation after the dead time.

If the current control signal PROTECT becomes "H" level at the time point when the detection current has exceeded the current limit level and if the operation is shifted to the short-circuit braking operation after the dead time (all the outputs are OFF), regenerated currents flow to the power supply side during the dead time, and there is a possibility that the power supply voltage rises (this will be described later referring to FIG. 10). To solve this problem, the motor drive apparatus according to Embodiment 1 is configured that the current control signal PROTECT becomes "H" level at the time point when the detection current has exceeded the current limit level, that a dead time for preventing flow-through operation is set for one- or two-phase PWM signals having been turned ON, and that the low-side drive transistors are turned ON after the dead time.

The detection current does not exceed the current limit level while all the three-phase PWM signals are ON. This is because the state in which all the three-phase PWM signals are ON is a state in which freewheeling operation is performed among the high-side drive transistors and no current flows in the current detector 10.

In the motor drive apparatus according to Embodiment 1, even when the current control signal PROTECT becomes "H" level at the switching timing including the change time point from ON to OFF or from OFF to ON of the PWM signal, the operation state is shifted to the short-circuit braking state, just like the above-mentioned operation.

As described above, in the motor drive apparatus according to Embodiment 1, the current limit level reaching timing is detected while eliminating the effect of the high-frequency switching noise, and the short-circuit braking operation is carried out for a constant period in the predetermined period Tb from the timing, whereby current limitation and current peak value control are performed.

Figure 9:
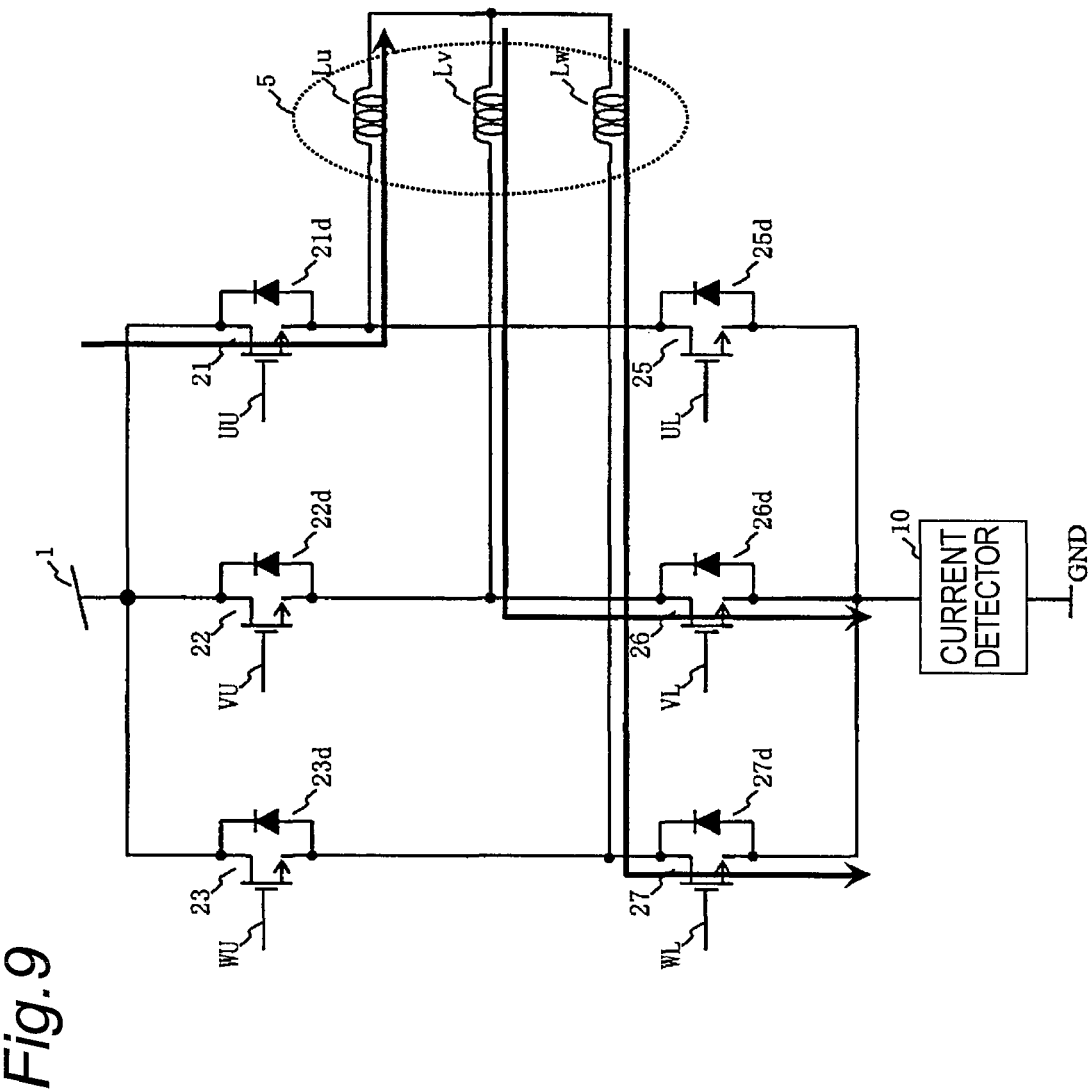
FIG. 9 is a view showing an example of current paths during normal operation.

Next, the reason why the current limitation is performed using the short-circuit braking operation will be described referring to FIGS. 9 and 10. FIG. 9 is a circuit diagram showing an example of current paths at the time when the motor 5 rotates normally. Referring to FIG. 9, the U-phase high-side drive transistor 21 is ON, and the V-phase and W-phase low-side drive transistors 26 and 27 are ON. At this time, as shown in FIG. 9, the currents flowing from the power supply unit 20 to the motor 5 flow from the power supply 1 to the U-phase coil Lu of the motor 5 via the U-phase high-side drive transistor 21, from the V-phase coil Lv to the ground side (GND side) via the V-phase low-side drive transistor 26, and from the W-phase coil Lw to the ground side (GND side) via the W-phase low-side drive transistor 27. In other words, the motor 5 and the power supply unit 20 are in a state in which the currents flow from the U-phase to the V-phase and the W-phase. When an overcurrent is detected in this state, all the drive transistors according to the above-mentioned conventional configuration are turned OFF to perform current shutoff.

Figure 10:
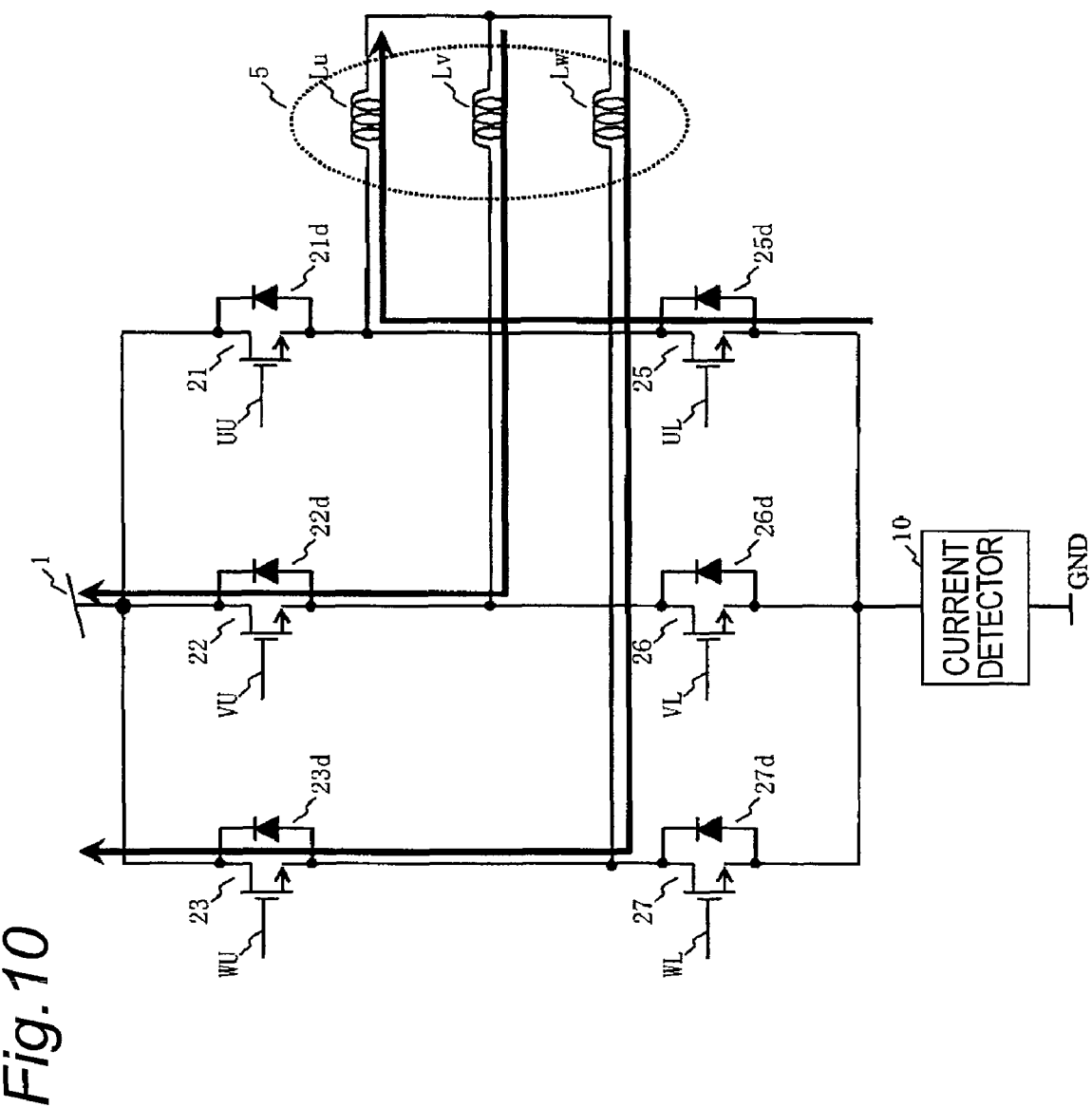
FIG. 10 is a view showing current paths at the time when all the outputs are turned OFF from the state shown in FIG. 9.

FIG. 10 is a circuit diagram showing current paths at the time when all the drive transistors are turned OFF from the state shown in FIG. 9. Since the currents flowing through the coils for the respective phases tend to flow continuously owing to inductance, in the case that all the transistors are turned OFF, currents are regenerated from the ground side (GND side) to the power supply side as shown in the figure. In other words, the current flowing through the U-phase coil Lu flows from the ground side (GND side) via the freewheeling diode 25d connected in parallel with the U-phase low-side drive transistor 25. Furthermore, the currents flowing through the V-phase coil Lv and the W-phase coil Lw flow to the power supply side via the freewheeling diode 22d connected in parallel with the V-phase high-side drive transistor 22 and the freewheeling diode 23d connected in parallel with the W-phase high-side drive transistor 23, respectively. Hence, all the currents flowing immediately before all the drive transistors are turned OFF are regenerated to the power supply side. At this time, the regenerated circuits become excessive depending on the power supply capability of the power supply 1, and the power supply voltage rises in some cases. Hence, the power supply voltage reaches the rated power supply voltage or more in some cases, and the drive transistors and other devices may eventually be degraded or damaged. Furthermore, at the time of the regeneration to the power supply side, the amounts of the currents flowing through the motor 5 decrease remarkably and the currents change abruptly, whereby current ripples increase and the waveforms of the drive currents are disturbed greatly. Hence, noise increases accordingly.

In the case of the conventional configuration in which current limitation is carried out by turning OFF all the drive transistors as described above, there is a fear of damaging devices owing to the rising in the power supply voltage during the current limitation, and there is a problem of generating noise owing to the abrupt change in the waveforms of the drive currents, the increase in current ripples, the disturbances in the waveforms of the drive currents, etc.

In the motor drive apparatus according to Embodiment 1 of the present invention, for the purpose of solving the above-mentioned problems, the short-circuit braking operation is carried out during the current limitation without turning OFF all the outputs of the drive transistors.

Figure 11:
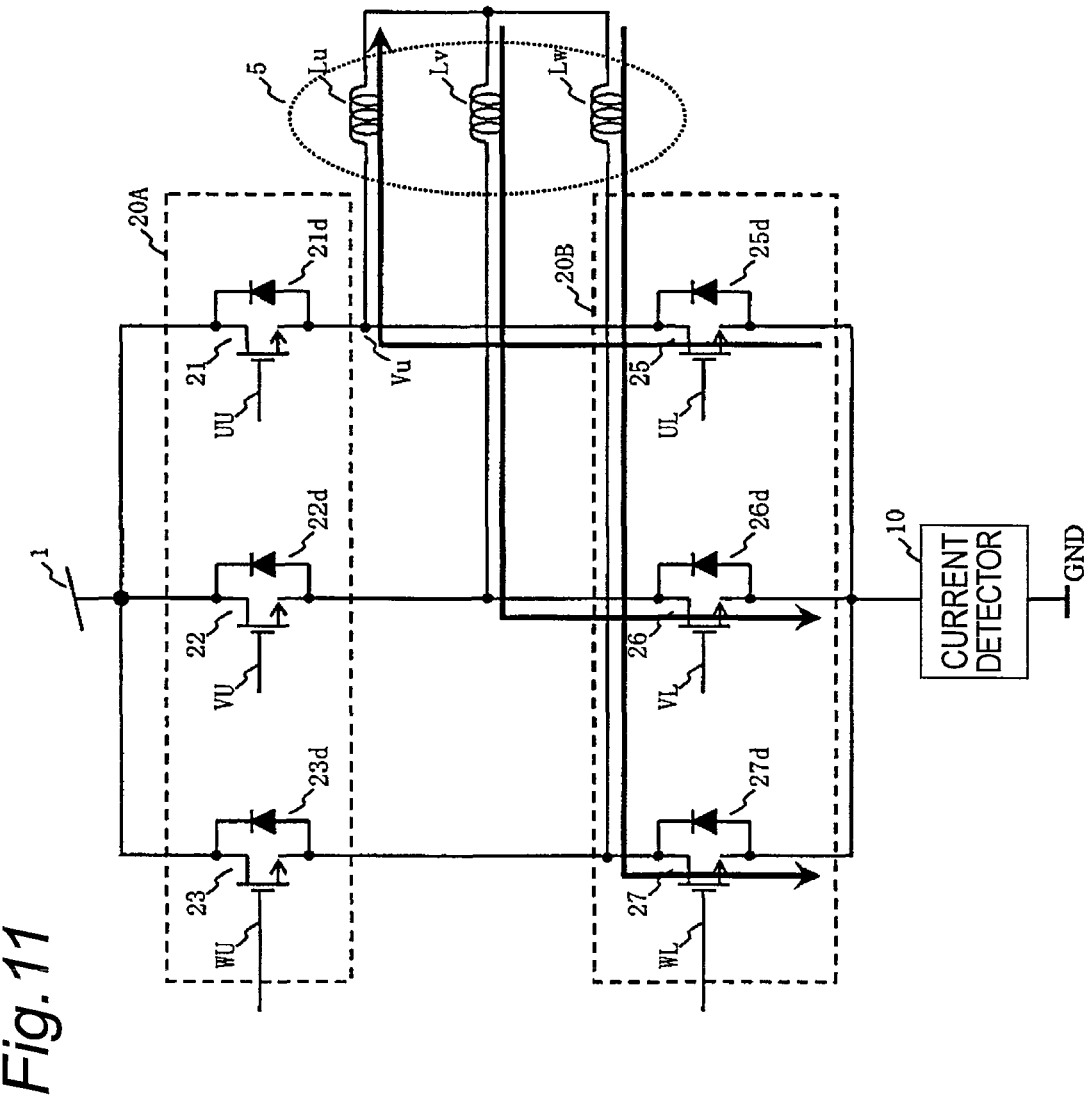
FIG. 11 is a view showing current paths at the time when the state shown in FIG. 9 is shifted to a short-circuit braking operation state.

FIG. 11 is a circuit diagram showing current paths at the time when the short-circuit braking operation is performed. The motor drive apparatus according to Embodiment 1 carries out the short-circuit braking operation in which the high-side drive transistor group 20A is turned OFF and the low-side drive transistor group 20B is turned ON. For this reason, the low-side drive transistor group 20B is short-circuited to the respective phase coils Lu, Lv and Lw during the short-circuit braking operation. Hence, since the current having flowing through the U-phase coil Lu flows via the U-phase low-side drive transistor 25 during the current limitation, no current flows to the power supply side and the GND side, and paths in which the currents return through the low-side drive transistor group 20B and the coils Lu, Lv and Lw are formed. For this reason, in the motor drive apparatus according to Embodiment 1, the power supply voltage does not rise during the current limitation, and the currents decrease smoothly and gradually at the reduction amount determined by the counter electromotive force and the resistance component of the motor during the short-circuit braking operation. Furthermore, in the motor drive apparatus according to Embodiment 1, the current decrease amounts are small, the current changes are small, the current ripples are small, and the disturbances in the waveforms of the drive currents are also small in comparison with the case that all the outputs of the drive transistors are turned OFF as in the case of the conventional configuration. As a result, the motor drive apparatus according to Embodiment 1 can remarkably reduce noise during the current limitation.

The effects of the motor drive apparatus according to Embodiment 1 will be described below further.

When the operation state is shifted to the short-circuit braking state using the current control signal PROTECT, the current flowing through the motor 5 decreases, and the current limitation is performed. In the motor drive apparatus according to Embodiment 1, since the current limitation is carried out using the short-circuit braking operation without turning OFF all the outputs of the drive transistors during the current limitation, abrupt current decrease is suppressed. In addition, since the short-circuit braking operation period during the current limitation is set to a constant value, the predetermined period Tb, current ripples during the current limitation can also be suppressed small. In the timing chart shown in FIGS. 7A to 7G described above, the case in which the current control signal PROTECT cuts in only once is described. However, in reality, since the operation returns to the normal operation after the expiration of the predetermined period Tb, the detection current eventually exceeds the current limit level after the return. As a result, the short-circuit braking operation and the normal operation are repeated during the current limitation, whereby the current ripple peak value can be controlled small. This decreases the disturbances in the waveforms of the drive currents during the current limitation. It is preferable that the predetermined period Tb during the current limitation should be set so as to be shorter than the inverse number of approximately 20 kHz, i.e., the audible range. In other words, it is preferable that the predetermined period Tb should be set to Tb<$\frac{1}{20000}$ sec. This setting is done to set the repetition frequency of the short-circuit braking operation and the normal operation during the current limitation to 20 kHz, i.e., the audible range, or more As described above, in the motor drive apparatus according to Embodiment 1, the current detector 10 detects the total current flowing through the power supply unit 20. In the current controller 50, the current detection signal CDET is not filtered but directly compared with the reference voltage Vref, whereby the current exceeding the current limit level is detected while eliminating the effect of the high-frequency switching noise using the PWM mask signal PWMMASK. For this reason, the motor drive apparatus according to Embodiment 1 can detect even instantaneous current peaks other than the high-frequency switching noise.

Furthermore, in the motor drive apparatus according to Embodiment 1, since no devices are necessary to form a filter, current peak value control can be carried out using a simple configuration.

Still further, in the motor drive apparatus according to Embodiment 1, when the current exceeds the current limit level, the period adjustment circuit 54 of the current controller 50 outputs the current control signal PROTECT having a constant value to the gate drive circuit 40 for a predetermined period. In addition, the gate drive circuit 40 carries out the current limitation by making the respective drive transistors of the power supply unit 20 perform the short-circuit braking operation in response to the current control signal PROTECT. As a result, in the motor drive apparatus according to Embodiment 1, abrupt decrease in drive currents can be suppressed in comparison with the operation in the conventional configuration in which all the outputs of the drive transistors are turned OFF.

Furthermore, in the motor drive apparatus according to Embodiment 1, the short-circuit braking operation period is set to the constant predetermined period Tb during the current limitation. Hence, the current ripples during the current limitation can be suppressed small. Moreover, since the current limitation operation and the normal operation are repeated according to the above-mentioned predetermined period Tb, switching failure can be prevented. As a result, the motor drive apparatus according to Embodiment 1 can suppress the disturbances in the waveforms of the drive currents. In other words, the motor drive apparatus according to Embodiment 1 can reduce noise during the current limitation.

Still further, in the motor drive apparatus according to Embodiment 1, no regenerated current flows to the power supply side, and the power supply voltage does not rise, whereby there is no fear of degrading or damaging the drive transistors and other devices owing to the rising in power supply voltage.

A highly reliable apparatus being capable of reducing noise during the current limitation and having no fear of degrading or damaging devices owing to the rising in power supply voltage can be provided by using the motor drive apparatus according to Embodiment 1 for an optical disc apparatus serving as an apparatus for driving optical discs. In addition, while the current limitation is performed, offensive noise is reduced, and the apparatus does not become inoperative owing to degradation or damage in the drive transistors and other devices of the motor drive apparatus. As a result, it is possible to configure an optical disc apparatus having higher reliability.

Furthermore, it is possible to construct a motor incorporating the configuration of the motor drive apparatus according to Embodiment 1. It is thus possible to provide a highly reliable motor having the excellent effects of the above-mentioned motor drive apparatus.

The motor drive apparatus according to Embodiment 1 has been described by taking the configuration in which the current detector 10 is connected between the power supply unit 20 and the ground side (GND side) as an example. However, the current detector 10 may be connected between the power supply unit 20 and the DC power supply 1. Furthermore, in the motor drive apparatus according to Embodiment 1, the current peak value control is performed during the current limitation by carrying out the so-called short-circuit braking operation in which all of the low-side drive transistor group 20B of the power supply unit 20 are turned ON and all of the high-side drive transistor group 20A are turned OFF. However, the current peak value control may also be performed in an opposite way by carrying out the short-circuit braking operation in which all of the high-side drive transistor group 20A of the power supply unit 20 are turned ON and all of the low-side drive transistor group 20B are turned OFF, and similar effects are obtained.

In addition, the apparatus may also be operated, for example, such that the reference voltage Vref is adjustable according to an external input, and the current limit level can also be set as desired. Furthermore, the predetermined period Ta of the PWM mask signal PWMMASK should only be set to a period range in which the effect of the high-frequency switching noise can be eliminated, and can be set as desired. The apparatus may also be operated such that the predetermined period is adjustable according to an external input.

Furthermore, although the current detector 10 has been described as a resistor, a current sensor or the like may also be used to detect current. Moreover, the current detector 10 may be connected independently to each phase, and current limitation operation may be carried out so that the so-called short-circuit braking state is attained when one of the phase currents exceeds the current limit level. In this case, effects similar to those obtained in Embodiment 1 can be obtained. Still further, it is needless to say that the configuration can be changed and modified without changing the spirit of the present invention, and such configurations can also be included in the present invention.

Embodiment 2

Figure 12:
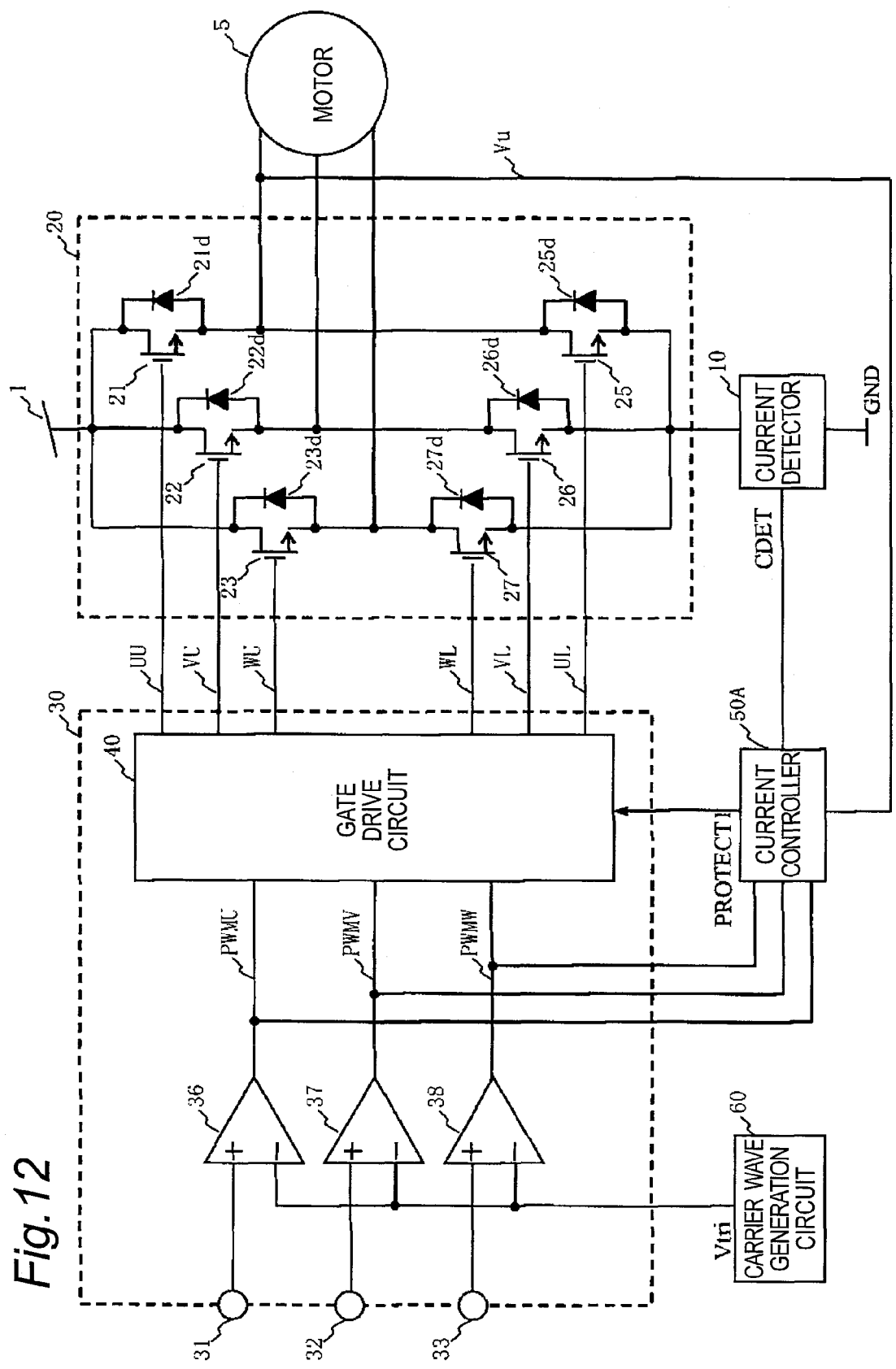
FIG. 12 is a view showing the overall configuration of a motor drive apparatus according to Embodiment 2 of the present invention.

Next, a motor drive apparatus and a motor drive method according to Embodiment 2 of the present invention will be described referring to FIGS. 12 to 14. FIG. 12 is a view showing the overall configuration of the motor drive apparatus according to Embodiment 2. The motor drive apparatus according to Embodiment 2 differs from the motor drive apparatus according to Embodiment 1 in the configuration of a current controller 50A and in that the U-phase terminal voltage Vu is input to the current controller 50A. Furthermore, although the short-circuit braking operation period during the current limitation according to Embodiment 1 is set to the constant predetermined period Tb, the motor drive apparatus according to Embodiment 2 differs in that the short-circuit braking operation period during the current limitation is variable depending on the detection result of a current decrease amount. Since the other configurations and operations according to Embodiment 2 are the same as those according to Embodiment 1, the components having the same functions and configurations are designated by the same numerals, and the descriptions in Embodiment 1 are applied to describe the components while overlapping descriptions are omitted herein.

Figure 13:
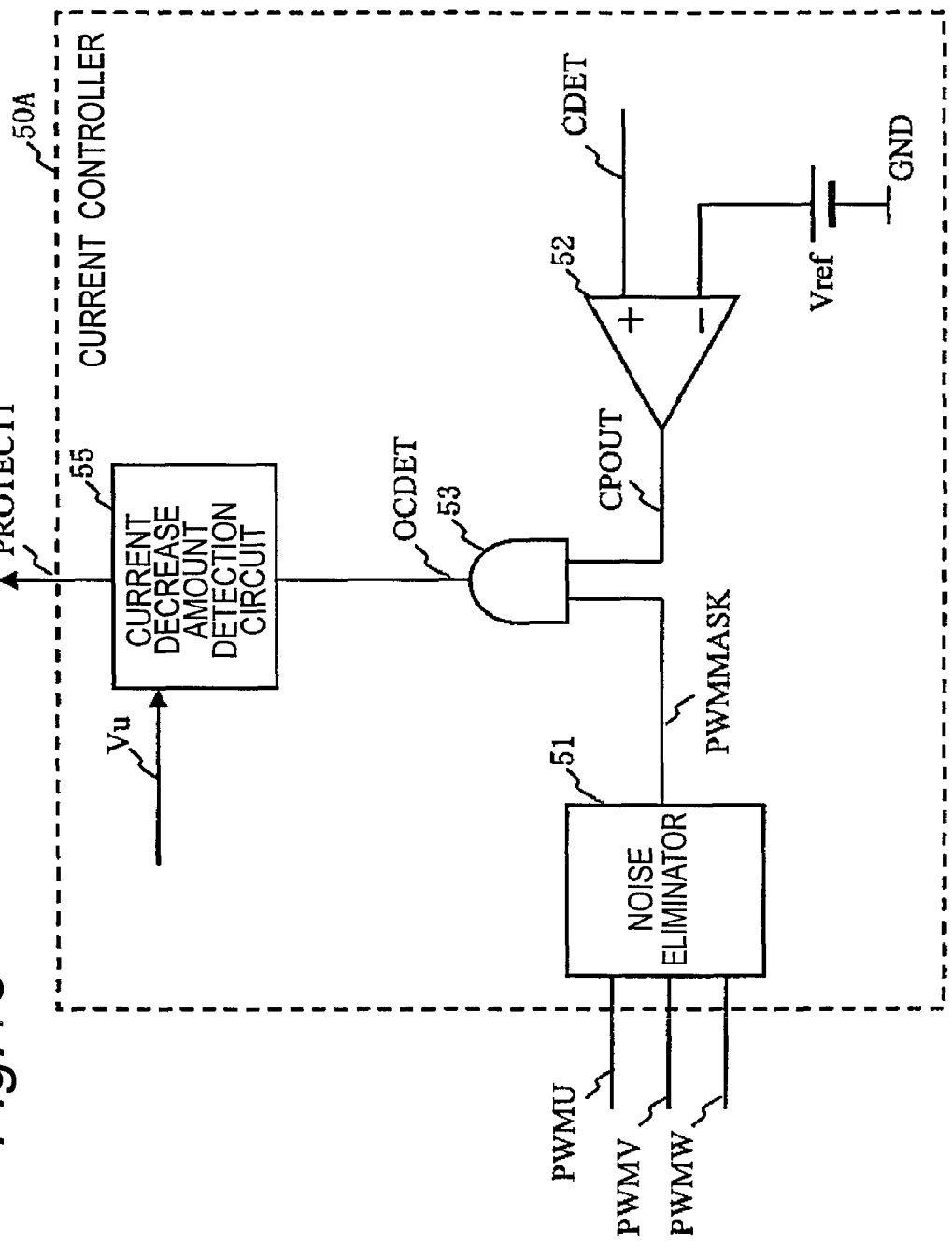
FIG. 13 is a view showing the circuit configuration of a current controller in the motor drive apparatus according to Embodiment 2.
Figure 14:
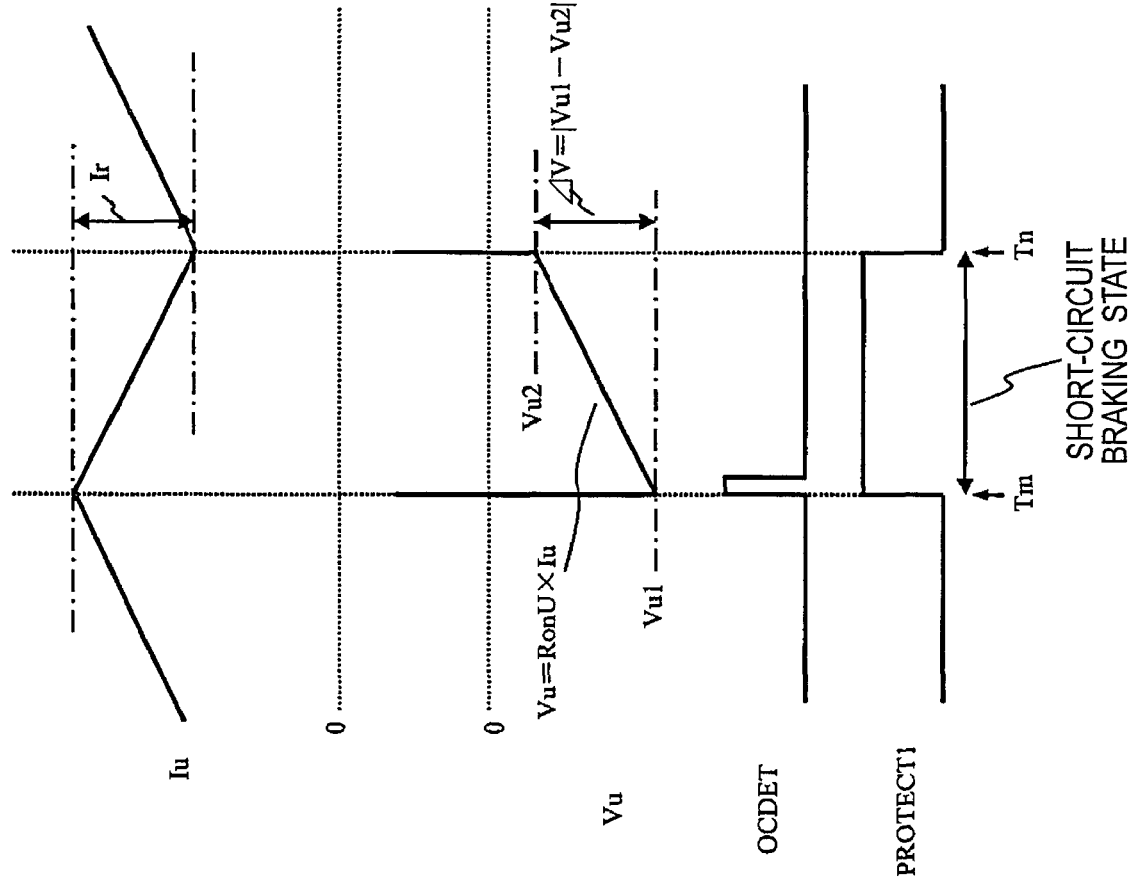
FIGS. 14A to 14D are timing charts illustrating the operations of the various sections of a current decrease amount detection circuit in the current controller shown in FIG. 13.
Figure 15:
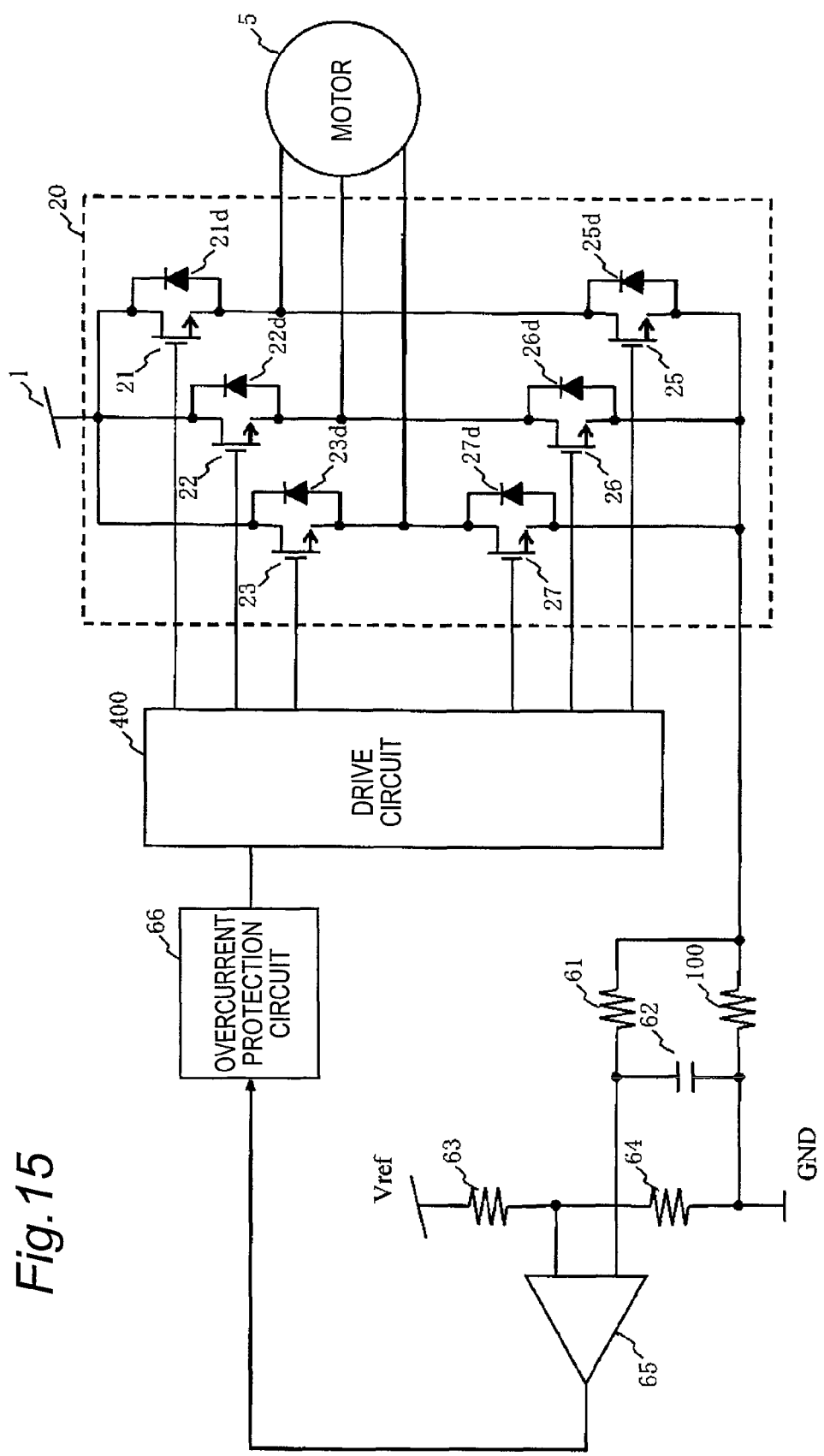
FIG. 15 is the view showing the overall configuration of the conventional motor drive apparatus for providing overcurrent protection.
Figure 16:
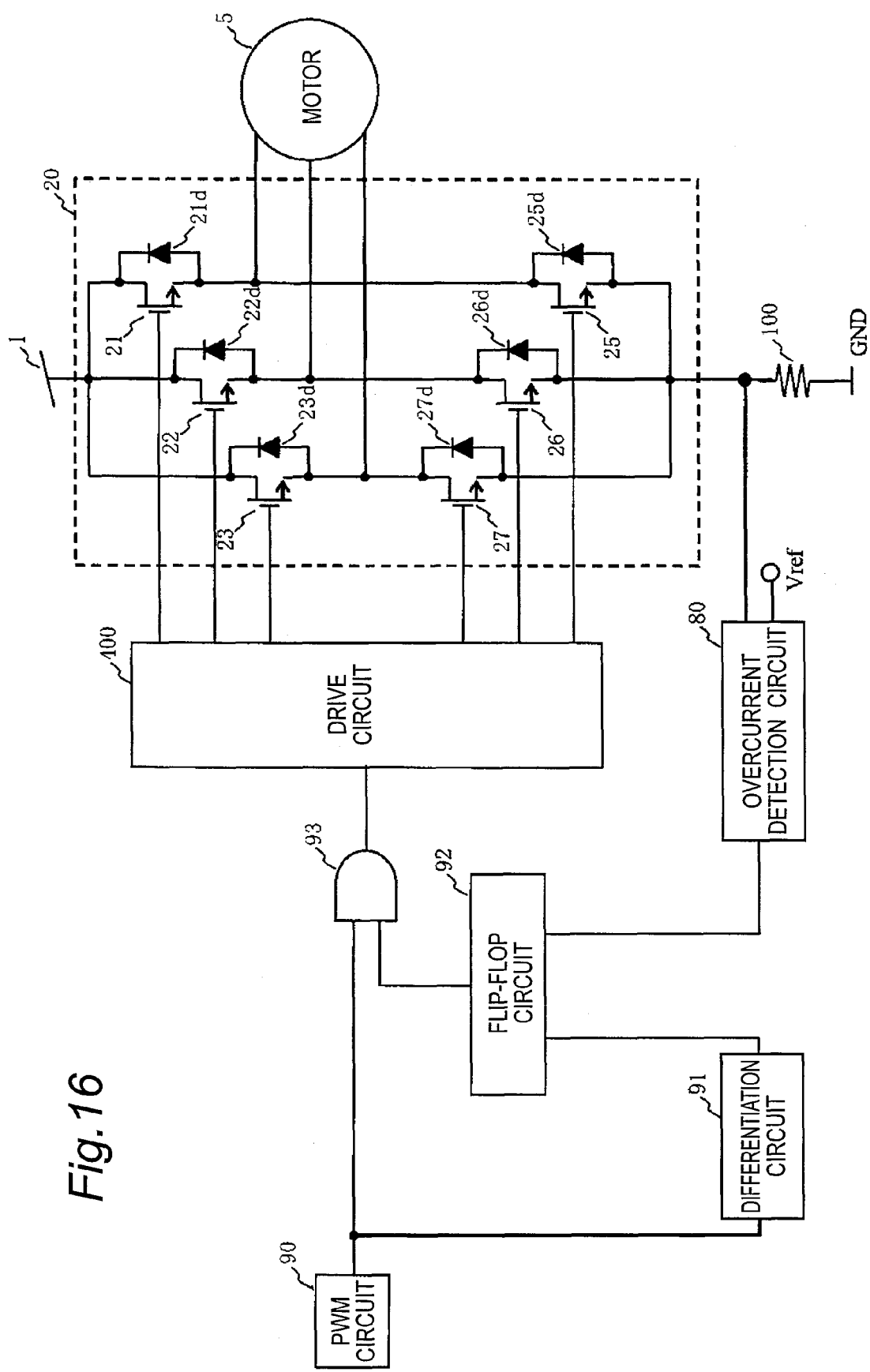
FIG. 16 is the view showing the overall configuration of the other conventional motor drive apparatus equipped with an overcurrent protection function.

FIG. 13 is a view showing the configuration of the current controller 50A of the motor drive apparatus according to Embodiment 2. The current controller 50A is different from the current controller 50 according to Embodiment 1 shown in FIG. 2 described above in that a current decrease amount detection circuit 55 is provided instead of the period adjustment circuit 54. The U-phase terminal voltage Vu and the overcurrent detection signal OCDET are input to the current decrease amount detection circuit 55. The current decrease amount detection circuit 55 detects the current decrease amount in the U-phase and outputs a current control signal PROTECT1 wherein the period from the start time point of current decrease owing to the current limitation to the time point in which the current decrease amount exceeds a predetermined amount is used as the short-circuit braking operation period. Since the operation that is carried out in the current controller 50A until the overcurrent detection signal OCDET is output is the same as the above-mentioned operation in Embodiment 1, the operation that is carried out after the overcurrent detection signal OCDET is output and until the current control signal PROTECT1 is output will be described herein.

The motor drive apparatus according to Embodiment 1 is configured that the current controller 50 outputs the current control signal PROTECT that is used to carry out the short-circuit braking operation for only the predetermined period Tb starting from the time point in which the overcurrent detection signal OCDET becomes "H" level. On the other hand, the motor drive apparatus according to Embodiment 2 is configured that the current controller 50A outputs the current control signal PROTECT1 that is used to start the short-circuit braking operation at the time point in which the overcurrent detection signal OCDET becomes "H" level and to end the short-circuit braking operation at the time point in which the current decrease amount exceeds the predetermined amount.

The current decrease amount is detected using the ON resistance RonU of the U-phase low-side drive transistor 25 of the power supply unit 20. The so-called short-circuit braking operation state in which all of the high-side drive transistor group 20A are OFF and all of the low-side drive transistor group 20B are ON is attained during the current limitation. According to the current paths during the short-circuit braking operation shown in FIG. 11 described above, the U-phase drive current Iu flows through the U-phase coil Lu via the U-phase low-side drive transistor 25. Hence, the U-phase terminal voltage Vu is represented by the product of the ON resistance RonU of the U-phase low-side drive transistor 25 and the U-phase drive current Iu. Hence, the decrease amount of the U-phase drive current Iu can be detected by monitoring the U-phase terminal voltage Vu during the short-circuit braking operation.

FIGS. 14A to 14D are timing charts illustrating the operation of the current decrease amount detection circuit 55. FIGS. 14A to 14D show the operation waveforms of the various sections at the time when the short-circuit braking operation is carried out for the current limitation. FIG. 14A shows the waveform of the U-phase drive current Iu, FIG. 14B shows the waveform of the U-phase terminal voltage Vu, FIG. 14C shows the waveform of the overcurrent detection signal OCDET, and FIG. 14D shows the waveform of the current control signal PROTECT1.

In the following descriptions, it is assumed that the current controller 50A detects that the total current flowing through the power supply unit 20 has exceeded the current limit level at time point Tm and that the overcurrent detection signal OCDET has been output. At this time, the current decrease amount detection circuit 55 outputs the current control signal PROTECT1 that turns OFF the high-side drive transistor group 20A of the power supply unit 20 and turns ON the low-side drive transistor group 20B to the gate drive circuit 40. Hence, the current limitation operation by the short-circuit braking operation is started. As a result, the U-phase drive current Iu begins to decrease at time point Tm. As described above, the U-phase terminal voltage Vu during the short-circuit braking operation is represented by the product of the U-phase drive current Iu and the ON resistance RonU of the U-phase low-side drive transistor 25. The waveform of the U-phase terminal voltage Vu shown in FIG. 14B is magnified particularly around the 0 level (GND level). The current decrease amount detection circuit 55 detects the U-phase terminal voltage Vu at the output time point in which the overcurrent detection signal OCDET is "H" level as Vu1. The current decrease continues while the short-circuit braking operation is carried out using the current control signal PROTECT1.

The motor drive apparatus according to Embodiment 2 is configured that the current decrease amount is detected using the U-phase terminal voltage and that a predetermined voltage ΔV is set so that the current decrease amount is set to the predetermined amount. The short-circuit braking operation is continued until the absolute value |Vu−Vu1| of the difference between the U-phase terminal voltage Vu during the current decrease and the U-phase terminal voltage Vu1 detected previously at the output time point in which the overcurrent detection signal OCDET is "H" level exceeds ΔV. The time point in which |Vu−Vu1| exceeds the predetermined voltage ΔV is set as a current limitation end point (time point Tn, voltage value Vu2), the current control signal PROTECT1 is set to "L" level, and the current limitation operation is thus ended. The current ripples Ir during the current limitation can be maintained at a nearly constant predetermined amount by carrying out the current limitation operation so that the current decrease amount does not reach the predetermined amount or more. As a result, the disturbances in the waveforms of the drive currents owing to the current ripples scarcely occur. Therefore, in the motor drive apparatus according to Embodiment 2, it is possible to control the waveforms of the drive currents during the current limitation more smoothly and to reduce noise further.

In the motor drive apparatus according to Embodiment 2, even when the motor used is changed in characteristics (various motor parameters, such as coil resistance, inductance and power generation constant), motor driving can be made possible so that the current decrease amount becomes a constant predetermined amount. Hence, in comparison with the motor drive apparatus according to Embodiment 1 described above in which the current limitation is carried out for a constant predetermined period, the motor drive apparatus according to Embodiment 2 can be driven while the current ripples are nearly constant. Accordingly, the disturbances in the waveforms of the drive currents can also be reduced.

With respect to the U-phase terminal voltage Vu1 at the start time (time point Tm) of the current limitation, in the case that the current limit level and the value of the ON resistance of the U-phase low-side drive transistor 25 are known in advance, the U-phase terminal voltage Vu at the start time of the current limitation is not required to be detected as Vu1, but the U-phase terminal voltage Vu may be given as a predetermined value Vu1.

Furthermore, the motor drive apparatus according to Embodiment 2 is configured that the current decrease amount is detected from the U-phase terminal voltage Vu. However, the phase for the detection in the present invention is not limited to the U-phase, but the current decrease amount may be detected similarly from the V-phase terminal voltage Vv or the W-phase terminal voltage Vw. Moreover, the present invention is not limited to have the configuration in which the current decrease amount in one phase is detected, but it is needless to say that similar effects are obtained by using a configuration in which the current decrease amounts in two or three phases are detected.

In addition, the predetermined amount (predetermined voltage) for detecting the current decrease amount can be set as desired and may be adjustable externally. It is preferable that the predetermined amount (predetermined voltage) is required to be set so that current ripples become small and to be set in a range in which the current limitation is made possible at all times. It is further preferable that the repetition frequency of the current limitation operation and the normal operation is set outside the audible range.

The motor drive apparatus according to Embodiment 2 is configured that the ON resistance of a drive transistor is used to detect the current decrease amount. However, the apparatus may also be configured that the current decrease amount is detected using a current sensor. Furthermore, the apparatus may also be configured that a resistor for current detection is inserted between a low-side drive transistor and the current detector 10 and that the current decrease amount is detected from the voltage across both terminals of the inserted resistor. Moreover, it may be possible to form a mirror circuit by connecting a drive transistor in parallel with a low-side drive transistor and to carry out current detection using the mirror circuit. As described above, various configurations can be used for current detection in Embodiment 2.

In the case that the current limitation is carried out by not using the short-circuit braking operation in which the high-side drive transistor group 20A is turned OFF and the low-side drive transistor group 20B is turned ON but reversely by using the short-circuit braking operation in which the high-side drive transistor group 20A is turned ON and the low-side drive transistor group 20B is turned OFF, the ON resistance of the high-side drive transistor should only be used as the ON resistance that is used to detect the current decrease amount.

Furthermore, a highly reliable apparatus being capable of reducing noise during the current limitation and having no fear of degrading or damaging devices owing to the rising in power supply voltage can be provided by using the motor drive apparatus according to Embodiment 2 for an optical disc apparatus serving as an apparatus for driving optical discs. In addition, by using the motor drive apparatus according to Embodiment 2 for an optical disc apparatus, offensive noise is reduced while the current limitation is performed, and the apparatus does not become inoperative owing to degradation or damage in the drive transistors and other devices of the motor drive apparatus. As a result, it is possible to configure an optical disc apparatus having higher reliability.

Furthermore, it is possible to construct a motor incorporating the configuration of the motor drive apparatus according to Embodiment 2. It is thus possible to provide a highly reliable motor having the above-mentioned effects.

The motor drive apparatus and the motor drive method according to Embodiment 2 of the present invention are characterized in that the short-circuit braking operation period during the current limitation is determined depending on the current decrease amount. It is needless to say that the configuration having this characteristic can be changed and modified without changing the spirit of the present invention, and such configurations can also be included in the present invention.

By the use of the motor drive apparatus and the motor drive method according to the present invention for various apparatuses to drive hard disks and removable disc-shaped recording media or to drive fans, compressors and the like of air conditioners, it is possible to further improve the reliability and the low-noise performance of the apparatuses to which the present invention is applied.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The present invention can provide a motor drive apparatus and a motor drive method being high in reliability and low in noise during current limitation by eliminating the effect of high-frequency switching noise using a simple configuration. Therefore, the present invention is versatile and applicable to various apparatuses.

What is claimed is:

1. A motor drive apparatus comprising:
    power supply means having a half-bridge circuit in which multiple-phase high-side drive transistors are connected in series with multiple-phase low-side drive transistors, respectively, and the respective connection points are used as the respective phase coil drive terminals of a motor,
    switching control means for pulse width modulation driving said power supply means using pulse width modulation signals,
    current detection means for detecting the current flowing through said power supply means, and
    current control means for outputting a current control signal for controlling the peak value of the detection current of said current detection means to a predetermined value or less, wherein
    said switching control means turns ON all of one-side drive transistors selected from said high-side drive transistors and said low-side drive transistors of said power supply means, and turns OFF all of the other-side drive transistors in response to said current control signal,
    and wherein a first period in synchronization with the edges of said pulse width modulation signals is used as a current detection prohibition period, and said current control means outputs said current control signal for controlling the peak value in periods other than said current detection prohibition period in which current detection using said current detection means is prohibited, to a predetermined value or less.

2. The motor drive apparatus according to claim 1, wherein said switching control means turns ON all of one-side drive transistors selected from said high-side drive transistors and said low-side drive transistors of said power supply means for a predetermined period, and turns OFF all of the other-side drive transistors for a predetermined period in response to said current control signal.

3. The motor drive apparatus according to claim 2, wherein said predetermined period is 1/20000 sec or less.

4. The motor drive apparatus according to claim 1, wherein said current control means comprises comparison means for comparing the detection current of said current detection means with a reference value and noise elimination means for outputting a noise elimination signal for prohibiting current detection in a first period in synchronization with the edges of said pulse width modulation signals, the synthesized signal of the output signal of said comparison means and said noise elimination signal is used as an overcurrent detection signal, and said current control signal for limiting current for a predetermined period from the rising time point of said overcurrent detection signal is output.

5. The motor drive apparatus according to claim 1, wherein said switching control means turns OFF all of one-side drive transistors selected from said high-side drive transistors and said low-side drive transistors of said power supply means by turning OFF the drive transistors included in said one-side drive transistors and having been turned ON, and turns ON all of the other-side drive transistors by turning ON the drive transistors included in said the other-side drive transistors and having been turned OFF after a dead time has passed, in synchronization with said current control signal.

6. An optical disc apparatus incorporating said motor drive apparatus according to claim 1.

7. A motor drive apparatus comprising:
    power supply means having a half-bridge circuit in which multiple-phase high-side drive transistors are connected in series with multiple-phase low-side drive transistors, respectively, and the respective connection points are used as the respective phase coil drive terminals of a motor,
    switching control means for pulse width modulation driving said power supply means using pulse width modulation signals,
    current detection means for detecting the current flowing through said power supply means, and
    current control means for outputting a current control signal for controlling the peak value of the detection current of said current detection means to a predetermined value or less, wherein
    said switching control means turns ON all of one-side drive transistors selected from said high-side drive transistors and said low-side drive transistors of said power supply means, and turns OFF all of the other-side drive transistors in response to said current control signal,
    said switching control means turns ON all of one-side drive transistors selected from said high-side drive transistors and said low-side drive transistors of said power supply means, and turns OFF all of the other-side drive transistors in response to said current control signal to carry out current limitation so that the current decrease amount during said current limitation period is not more than a predetermined amount, and
    a first period in synchronization with the edges of said pulse width modulation signals is used as a current detection prohibition period, and said current control means outputs said current control signal for controlling the peak value in periods other than said current detection prohibition period in which current detection using said current detection means is prohibited, to a predetermined value or less.

8. The motor drive apparatus according to claim 7, wherein said current control means comprises comparison means for comparing the detection current of said current detection means with a reference value and noise elimination means for outputting a noise elimination signal for prohibiting current detection in a first period in synchronization with the edges of said pulse width modulation signals, the synthesized signal of the output signal of said comparison means and said noise elimination signal is used as an overcurrent detection signal, and said current control signal for limiting current is output for a period from the rising time point of said overcurrent detection signal until the current decrease amount exceeds a predetermined amount.

9. The motor drive apparatus according to claim 7, wherein said switching control means turns OFF all of one-side drive transistors selected from said high-side drive transistors and said low-side drive transistors of said power supply means by turning OFF the drive transistors included in said one-side drive transistors and having been turned ON, and turns ON all of the other-side drive transistors by turning ON the drive transistors included in said the other-side drive transistors and having been turned OFF after a dead time has passed, in synchronization with said current control signal.

10. The motor drive apparatus according to claim 7, wherein said current control means is equipped with current decrease amount detection means, and said current decrease amount detection means is configured to detect the current decrease amount of at least one phase of the current flowing through said motor.

11. The motor drive apparatus according to claim 10, wherein said current decrease amount detection means detects the current decrease amount by detecting at least one phase of the output terminal voltage from the start time point of the current limitation depending on said current control signal.

12. A motor comprising:
a motor section having multiple-phase coils and a rotor,
power supply means having a half-bridge circuit in which respective phase high-side drive transistors are connected in series with respective phase low-side drive transistors, respectively, and the connection points are used as the respective phase coil drive terminals of said motor section,
switching control means for pulse width modulation driving said power supply means using pulse width modulation signals,
current detection means for detecting the current flowing through said power supply means, and
current control means for outputting a current control signal for controlling the peak value of the detection current of said current detection means to a predetermined value or less, wherein
said switching control means turns ON all of one-side drive transistors selected from said high-side drive transistors and said low-side drive transistors of said power supply means, and turns OFF all of the other-side drive transistors in response to said current control signal,
wherein a first period in synchronization with the edges of said pulse width modulation signals is used as a current detection prohibition period, and said current control means outputs said current control signal for controlling the peak value in periods other than said current detection prohibition period in which current detection using said current detection means is prohibited, to a predetermined value or less.

13. The motor according to claim 12, wherein said switching control means turns ON all of one-side drive transistors selected from said high-side drive transistors and said low-side drive transistors of said power supply means for a predetermined period, and turns OFF all of the other-side drive transistors for a predetermined period in response to said current control signal.

14. The motor according to claim 13, wherein said predetermined period is 1/20000 sec or less.

15. The motor according to claim 12, wherein said current control means comprises comparison means for comparing the detection current of said current detection means with a reference value and noise elimination means for outputting a noise elimination signal for prohibiting current detection in a first period in synchronization with the edges of sa id pulse width modulation signals, the synthesized signal of the output signal of said comparison means and said noise elimination signal is used as an overcurrent detection signal, and said current control signal for limiting current for a predetermined period from the rising time point of said overcurrent detection signal is output.

16. The motor according to claim 12, wherein said switching control means turns OFF all of one-side drive transistors selected from said high-side drive transistors and said low-side drive transistors of said power supply means by turning OFF the drive transistors included in said one-side drive transistors and having been turned ON, and turns ON all of the other-side drive transistors by turning ON the drive transistors included in said the other-side drive transistors and having been turned OFF after a dead time has passed, in synchronization with said current control signal.

17. An optical disc apparatus incorporating said motor according to claim 12.

18. A motor comprising:
a motor section having multiple-phase coils and a rotor,
power supply means having a half-bridge circuit in which respective phase high-side drive transistors are connected in series with respective phase low-side drive transistors, respectively, and the connection points are used as the respective phase coil drive terminals of said motor section,
switching control means for pulse width modulation driving said power supply means using pulse width modulation signals,
current detection means for detecting the current flowing through said power supply means, and
current control means for outputting a current control signal for controlling the peak value of the detection current of said current detection means to a predetermined value or less, wherein
said switching control means turns ON all of one-side drive transistors selected from said high-side drive transistors and said low-side drive transistors of said power supply means, and turns OFF all of the other-side drive transistors in response to said current control signal to carry out current limitation so that the current decrease amount during said current limitation period is not more than a predetermined amount and
a first period in synchronization with the edges of said pulse width modulation signals is used as a current detection prohibition period, and said current control means outputs said current control signal for controlling the peak value in periods other than said current detection prohibition period, in which current detection using said current detection means is prohibited, to a predetermined value or less.

19. The motor according to claim 18,
wherein said current control means comprises comparison means for comparing the detection current of said current detection means with a reference value and noise elimination means for outputting a noise elimination signal for prohibiting current detection in a first period in synchronization with the edges of said pulse width modulation signals, the synthesized signal of the output signal of said comparison means and said noise elimination signal is used as an overcurrent detection signal, and said current control signal for limiting current is output for a period from the rising time point of said overcurrent detection signal until the current decrease amount exceeds a predetermined amount.

20. The motor according to claim 18, wherein said switching control means turns OFF all of one-side drive transistors selected from said high-side drive transistors and said low-side drive transistors of said power supply means by turning OFF the drive transistors included in said one-side drive transistors and having been turned ON, and turns ON all of the other-side drive transistors by turning ON the drive transistors included in said the other-side drive transistors and having been turned OFF after a dead time has passed, in synchronization with said current control signal.

21. The motor according to claim 18, wherein said current control means is equipped with current decrease amount detection means, and said current decrease amount detection means is configured to detect the current decrease amount of at least one phase of the current flowing through said motor section.

22. The motor according to claim 21, wherein said current decrease amount detection means detects the current decrease amount by detecting at least one phase of the output terminal voltage from the start time point of the current limitation depending on said current control signal.

23. A motor drive method comprising:

a switching control step of carrying out pulse width modulation drive using pulse width modulation signals, a current detection step of detecting the current flowing through a motor, and a current control step of outputting a current control signal for controlling the peak value of the detection current detected at said current detection step to a predetermined value or less, wherein said current control step comprises:

a comparison step of comparing the detection current detected at said current control step with a reference value, a noise elimination step of outputting a noise elimination signal for prohibiting current detection in a first period in synchronization with the edges of said pulse width modulation signals, and a current control signal output step of using the synthesized signal of the signal output at said comparison step and said noise elimination signal as an overcurrent detection signal and outputting said current control signal for limiting current from the rising time point of said overcurrent detection signal, and said switching control step turns ON all of one-side drive transistors selected from said high-side drive transistors and said low-side drive transistors, and turns OFF all of the other-side drive transistors in response to said current control signal.

24. The motor drive method according to claim 23, wherein said current control signal output step uses the synthesized signal of the signal output at said comparison step and said noise elimination signal as an overcurrent detection signal and outputs said current control signal for limiting current for a predetermined period from the rising time point of said overcurrent detection signal.

25. The motor drive method according to claim 23, wherein said current control signal output step uses the synthesized signal of the signal output at said comparison step and said noise elimination signal as an overcurrent detection signal and outputs said current control signal for limiting current for a period from the rising time point of said overcurrent detection signal until the current decrease amount exceeds a predetermined amount.

* * * * *